(12) United States Patent
Nakata et al.

(10) Patent No.: US 7,830,753 B2
(45) Date of Patent: Nov. 9, 2010

(54) OPTICAL DISC, OPTICAL DISC DRIVE, OPTICAL DISC RECORDING/REPRODUCING METHOD, AND INTEGRATED CIRCUIT

(75) Inventors: Kohei Nakata, Nara (JP); Naohiro Kimura, Kyoto (JP); Harumitsu Miyashita, Nara (JP); Hiroshi Ueda, Nara (JP); Yoshikazu Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 133 days.

(21) Appl. No.: 12/272,948

(22) Filed: Nov. 18, 2008

(65) Prior Publication Data

US 2009/0180361 A1  Jul. 16, 2009

(30) Foreign Application Priority Data

Nov. 20, 2007 (JP) ............................ 2007-300136
Nov. 4, 2008 (JP) ............................ 2008-283341
Nov. 17, 2008 (JP) ............................ 2008-293277

(51) Int. Cl.
*G11B 7/085* (2006.01)
*G11B 7/24* (2006.01)

(52) U.S. Cl. ............... 369/30.18; 369/275.1; 369/47.22; 369/47.27

(58) Field of Classification Search ............ 369/275.1, 369/275.3, 275.4, 30.18, 47.22, 47.27, 30.01, 369/44.28, 59.22, 59.25
See application file for complete search history.

(56) References Cited

U.S. PATENT DOCUMENTS 7,116,630 B2 * 10/2006 Ishibashi et al. ......... 369/275.4
7,274,635 B2    9/2007 Kobayashi et al.
7,474,607 B2 *  1/2009 Ishibashi et al. ......... 369/275.4
2003/0112725 A1 6/2003 Kobayashi et al.
2006/0146674 A1 7/2006 Nakamura et al.

FOREIGN PATENT DOCUMENTS

| JP | 2001-006293 | 1/2001 |
| JP | 2002-352521 | 12/2002 |
| JP | 2005-032440 | 2/2005 |

OTHER PUBLICATIONS

Blu-ray Disc Reader, published by Ohmsha, Ltd., pp. 14-15 and pp. 134-139 (cited in line 7 from the bottom, p. 90 of the specification) with a concise explanation.
White paper, Blu-ray Disc Format, General, Aug. 2004, pp. 1-37 (cited in line 6 from the bottom p. 90 of the specification).
White paper, Blu-ray Disc Format, 3. File System Specifications for BD-RE, R, ROM, Aug. 2004, pp. 1-6 (cited in line 6 from the bottom p. 90 of the specification).
White paper, Blu-ray Disc Format, 4. Key Technologies, Aug. 2004, pp. 1-8(cited in line 6 from the bottom p. 90 of the specification).
International Search Report for corresponding Application No. PCT/JP2008/003385 mailed Feb. 3, 2009.
Form PCT/ISA/237 and partial English translation.

* cited by examiner

*Primary Examiner*—Ali Neyzari
(74) *Attorney, Agent, or Firm*—Renner, Otto, Boisselle & Sklar, LLP

(57) ABSTRACT

In an optical disc, a track on which data is recordable is divided into a plurality of blocks, and each block includes L pieces of sub blocks. On each sub block, M-bit first digital information specifying a block address of a block including the each sub block and N-bit second digital information capable of representing a numerical value equal to or larger than L are recorded.

1 Claim, 13 Drawing Sheets (A) UP TO BLOCK ADDRESS 3FFFF (ADDRESSES COMPATIBLE WITH THOSE OF THE EXISTING DISC)

(B) FROM BLOCK ADDRESS 40000 TO 4FFFF (ADDRESSES FOR EXPANDED AREA)

(A) USING CONTROL INFORMATION BITS (B) USING THE LEAST SIGNIFICANT BIT (A) IN THE CASE OF BLOCK ADDRESS 0 × 20005

(B) IN THE CASE OF BLOCK ADDRESS 0 × 40001

(A) CONVENTIONAL RECORDING DENSITY (B) HIGH DENSITY RECORDING

IN THE CASE OF LAYER NUMBER 0, BLOCK ADDRESS 0 × 2000A, SUB BLOCK NUMBER 0 × 2

IN THE CASE OF LAYER NUMBER 0, BLOCK ADDRESS 0 × 80001, SUB BLOCK NUMBER 2

IN THE CASE OF LAYER NUMBER 1, BLOCK ADDRESS 0 × E200A, SUB BLOCK NUMBER 0 × 2

IN THE CASE OF LAYER NUMBER 1, BLOCK ADDRESS 0 × 70001, SUB BLOCK NUMBER 2

US 7,830,753 B2

OPTICAL DISC, OPTICAL DISC DRIVE, OPTICAL DISC RECORDING/REPRODUCING METHOD, AND INTEGRATED CIRCUIT

BACKGROUND OF THE INVENTION

1. Field of the Invention

The present invention relates to a format of address information which is used for correctly recording or reproducing information at a prescribed position in an information recording medium, and a technology for recording or reproducing information in accordance with the address information format.

2. Description of the Related Art

Recently, research and development of high density optical discs has been actively conducted. Currently, for example, Blu-ray Disc (BD) has been proposed and put into practice, and is used for recording digital broadcast or the like. Optical discs are now establishing their position as an important information medium. For further increasing the density, research and development for providing a higher recording density than that of BD to expand the recording capacity is now being conducted.

FIG. 13 shows an example of a format of track addresses pre-recorded on a track of a conventional optical disc. This is not a track address format of a BD mentioned above.

The track is divided into blocks by a data recording unit of 64 kB (kilobytes), and the blocks are sequentially assigned block address values. Each block is divided into sub blocks each having a prescribed length. Six sub blocks form one block. The sub blocks are assigned sub block numbers of 0 through 5 from the first sub block.

Digital information of 21 bits in total including 18-bit digital information representing the block addresses and 3-bit digital information representing the sub block number is pre-recorded on each sub block of the track. An optical disc apparatus for performing recording to or reproduction from the conventional optical disc reproduces the 21-bit digital information for each sub block and searches for a target block while following the block addresses and the sub block numbers, and thus can perform data recording to or data reproduction from the target block.

FIG. 14 shows the relationship between a range of addresses which can be represented by the address format of the conventional optical disc and the data recording capacity.

In the conventional optical disc, as shown in FIG. 13, 18-bit digital information is assigned as a block address. For example, in the case where the recording capacity is 15 gigabytes (GB), the block address values are represented by the numerals of 00000 through 39387 (hexadecimal notation).

FIG. 15 shows an address format of data addresses to be added to data at the time of data recording to a conventional optical disc.

Data is recorded as being divided into blocks each having 64 kilobytes (kB). The size of the data block is the same as the size of the block obtained by dividing the track. Each block is further divided into sectors each having 2 kB. As a result, one block includes 32 sectors.

Two consecutive sectors are managed as one data unit. At the start of each data unit, 4-byte (32-bit) data address information is inserted and recorded on a track. As shown in FIG. 15, the conventional data address information includes, from the least significant bit side, a 5-bit sector number, an 18-bit block address value, and 9-bit control information. Thus, the conventional data address information has 32 bits in total. The control information is used for describing layer information in the case where there are a plurality of recording layers.

The data address is provided at the start of each data unit. Therefore, the sector number assigned to the least significant 5 bits is always even-numbered. This means that the value of the least significant bit is always 0.

The 18-bit block address value is the same as the value of the block address pre-recorded on the track. A block address value of the target block in which data is to be recorded is assigned as the 18-bit block address value (see, for example, Japanese Laid-Open Patent Publication No. 2002-352521).

According to the address format of the conventional optical disc, the digital information assigned as a block address is of 18 bits. As shown in FIG. 14, only values of up to 3FFFF at the maximum can be represented as the block address. This means that the recording area is expandable only to 16.7 GB. This is not usable for an optical disc having a capacity of more than 16.7 GB so does not satisfy the demand for a significant expansion of the recording capacity.

In order to expand the recording capacity, digital information representing a block address to be recorded on the track could be expanded to be of equal to or more than 19 bits. However, the address format of such information is totally different from that of the conventional optical disc and is not compatible thereto. This requires installation of hardware (optical disc apparatus, optical disc production apparatus) corresponding to the new address format and significantly increases the cost.

Similarly, regarding the data address, the digital information representing a block address is of 18 bits. Therefore, the block addresses only in the range from 00000 through 3FFFF can be represented, and the capacity cannot be further expanded.

SUMMARY OF THE INVENTION

An object of the present invention is to provide an address format capable of managing a larger capacity than that of the conventional optical disc while being compatible with the address format of the conventional optical disc, and to provide an apparatus and a method capable of recording or reproducing information in accordance with such an address format.

An optical disc according to the present invention is an optical disc, in which a track on which data is recordable is divided into a plurality of blocks, and each block includes L pieces of sub blocks. On each sub block, M-bit first digital information specifying a block address of a block including the each sub block and N-bit second digital information capable of representing a numerical value equal to or larger than L are recorded. Where a value of the block address is smaller than a threshold value, the second digital information represents a value specifying a number pre-assigned to the each sub block; whereas where the value of the block address is equal to or larger than the threshold value, the second digital information represents a value other than the value specifying the number pre-assigned to the each sub block. Or, where the value of the block address is equal to or larger than the threshold value, the second digital information represents the value specifying the number pre-assigned to the each sub block; whereas where the value of the block address is smaller than the threshold value, the second digital information represents a value other than the value specifying the number pre-assigned to the each sub block.

The optical disc may comprise a plurality of layers on which data is recordable. In one of an odd-numbered layer and an even-numbered layer, where the value of the block address is smaller than the threshold value, the second digital information may represent the value specifying the number pre-assigned to the each sub block; whereas where the value of the block address is equal to or larger than the threshold value, the second digital information may represent a value other than the value specifying the number pre-assigned to the each sub block. In the other of the odd-numbered layer and the even-numbered layer, where the value of the block address is equal to or larger than the threshold value, the second digital information may represent the value specifying the number pre-assigned to the each sub block; whereas where the value of the block address is smaller than the threshold value, the second digital information may represent a value other than the value specifying the number pre-assigned to the each sub block.

The L may be larger than a maximum value represented by an N−1-bit digital value and smaller than a maximum value represented by an N-bit digital value.

The threshold value may be a maximum value represented by a digital value of the M bits or a minimum value represented by the digital value of the M bits.

Where the value of the block address is smaller than the threshold value, the first digital information may represent a value specifying the block address; whereas where the value of the block address is equal to or larger than the threshold value, the first digital information may represent the value specifying the sub block number pre-assigned to the each sub block and a value specifying a part of the block address of the block including the each sub block. Or, where the value of the block address is equal to or larger than the threshold value, the first digital information may represent the value specifying the block address; whereas where the value of the block address is smaller than the threshold value, the first digital information may represent the value specifying the sub block number assigned to the each sub block and a value specifying a part of the block address of the block including the each sub block.

In the M-bit first digital information, the least significant N bits may represent the value specifying the sub block number, and the most significant M-N bits may represent the least significant M-N bits of the block address.

Each piece of the data recorded on the track may be divided into a multiplicity of blocks having the same data size as that of each of the plurality of blocks, and each of the multiplicity of blocks may include a plurality of sectors. Fifth digital information may be added to each piece of the data, the fifth digital information at least including third digital information specifying a block address of each of the multiplicity of blocks and fourth digital information specifying a sector number of a sector in each block.

The third digital information may be (M+1)-bit digital information, which may be capable of representing a value of a block address equal to or larger than the threshold value or which may be capable of representing a value of a block address smaller than the threshold value.

The fifth digital information may be added to each two sectors among the plurality of sectors included in the data. The third digital information included in the fifth digital information may be M-bit digital information of the same number of bits as the first digital information pre-recorded on the track, and the third digital information may be assigned a value of the least significant M bits of a recording target block address on which data is to be recorded. Where the value of the recording target block address is smaller than the threshold value, the fourth digital information included in the fifth digital information may represent one of an even-numbered value and an odd-numbered value; whereas where the value of the recording target block address is equal to or larger than the threshold value, the fourth digital information included in the fifth digital information may represent the other of the even-numbered value and the odd-numbered value. Or, where the value of the recording target block address is equal to or larger than the threshold value, the fourth digital information included in the fifth digital information may represent one of the even-numbered value and the odd-numbered value; whereas where the value of the recording target block address is smaller than the threshold value, the fourth digital information included in the fifth digital information may represent the other of the even-numbered value and the odd-numbered value.

A recordable data capacity may be equal to or larger than 25 gigabytes.

The first digital information may be of 19 bits (M=19); the second digital information may be of 2 bits (N=2); and the second digital information and the first digital information may be located sequentially from the least significant bit.

Where the value of the block address is smaller than the threshold value, the second digital information may represent the value specifying the number pre-assigned to the each sub block by any one of 0x0 through 0x2 (hexadecimal notation); whereas where the value of the block address is equal to or larger than the threshold value, the second digital information may represent the value specifying the number pre-assigned to the each sub block by 0x3. Or, where the value of the block address is equal to or larger than the threshold value, the second digital information may represent the value specifying the number pre-assigned to the each sub block by any one of 0x0 through 0x2 (hexadecimal notation); whereas where the value of the block address is smaller than the threshold value, the second digital information may represent the value specifying the number pre-assigned to the each sub block by 0x3.

Where the wavelength of laser light directed to the track is $\lambda$, the numerical aperture of an objective lens for collecting the laser light to the track is NA, the length of a shortest mark recordable on the track is Tm, and the length of a shortest space on the track is Ts, the relationship of $(Tm+Ts) < \lambda/(2NA)$ may be fulfilled.

The wavelength $\lambda$ of the laser light may be 400 nm through 410 nm.

The numerical aperture NA of the objective lens may be 0.84 through 0.86.

Tm+Ts obtained by adding the length Tm of the shortest mark and the length Ts of the shortest space may be smaller than 238.2 nm.

The data to be recorded on the optical disc may be modulated by a 1-7 modulation rule, and the length of the shortest mark may be 2T and the length of the shortest space may be 2T.

An optical disc apparatus according to the present invention is an optical disc apparatus capable of performing at least one of data recording and data reproduction to and from the above-described optical disc. The optical disc apparatus comprises an optical head for emitting a light beam toward the optical disc and outputting a reproduction signal in accordance with a light amount of the reflected light; a track address reproducing circuit for reproducing the first digital information and the second digital information recorded on the track, based on the reproduction signal; a processor for specifying the block address and the number of the sub block based on the reproduced first digital information and the reproduced second digital information, and controlling a position in the track toward which the optical head is to emit the light beam; and a data recording/reproducing circuit for controlling a power of the light beam to be emitted by the optical head in order to perform at least one of data reproduction based on the reproduction signal and data recording to the track based on the reproduction signal. Where the second digital information represents a value specifying any number pre-assigned to the each sub block, the processor determines that the block address represented by the first digital information is of a value smaller than the threshold value; whereas where the second digital information represents a value other than the value specifying any number pre-assigned to the each sub block, the processor determines that the block address represented by the first digital information is of a value equal to or larger than the threshold value. Or, where the second digital information represents a value specifying any number pre-assigned to the each sub block, the processor determines that the block address represented by the first digital information is of a value equal to or larger than the threshold value; whereas where the second digital information represents a value other than the value specifying any number pre-assigned to the each sub block, the processor determines that the block address represented by the first digital information is of a value smaller than the threshold value. The processor specifies the block address and the number of the sub block based on the determination result.

A chip circuit according to the present invention is a chip circuit incorporatable into an optical disc apparatus capable of performing at least one of data recording and data reproduction to and from the above-described optical disc. The optical disc apparatus includes an optical head for emitting a light beam toward the optical disc and outputting a reproduction signal in accordance with a light amount of the reflected light. The chip circuit comprises a track address reproducing circuit for reproducing the first digital information and the second digital information recorded on the track, based on the reproduction signal; a processor for specifying the block address and the number of the sub block based on the reproduced first digital information and the reproduced second digital information, and controlling a position in the track toward which the optical head is to emit the light beam; and a data recording/reproducing circuit for controlling a power of the light beam to be emitted by the optical head in order to perform at least one of data reproduction based on the reproduction signal and data recording to the track based on the reproduction signal. Where the second digital information represents a value specifying any number pre-assigned to the each sub block, the processor determines that the block address represented by the first digital information is of a value smaller than the threshold value; whereas where the second digital information represents a value other than the value specifying any number pre-assigned to the each sub block, the processor determines that the block address represented by the first digital information is of a value equal to or larger than the threshold value. Or, where the second digital information represents a value specifying any number pre-assigned to the each sub block, the processor determines that the block address represented by the first digital information is of a value equal to or larger than the threshold value; whereas where the second digital information represents a value other than the value specifying any number pre-assigned to the each sub block, the processor determines that the block address represented by the first digital information is of a value smaller than the threshold value. The processor specifies the block address and the number of the sub block based on the determination result.

An address reproducing method according to the present invention is an address reproducing method executable by an optical disc apparatus capable of performing at least one of data recording and data reproduction to and from the above-described optical disc. The address reproducing method comprises the steps of emitting a light beam toward the optical disc and outputting a reproduction signal in accordance with a light amount of the reflected light; reproducing the first digital information and the second digital information recorded on the track, based on the reproduction signal; specifying the block address and the number of the sub block based on the reproduced first digital information and the reproduced second digital information, and controlling a position in the track toward which the optical head is to emit the light beam; and controlling a power of the light beam to be emitted by the optical head in order to perform at least one of data reproduction based on the reproduction signal and data recording to the track based on the reproduction signal. Where the second digital information represents a value specifying any number pre-assigned to the each sub block, the step of controlling determines that the block address represented by the first digital information is of a value smaller than the threshold value; whereas where the second digital information represents a value other than the value specifying any number pre-assigned to the each sub block, the step of controlling determines that the block address represented by the first digital information is of a value equal to or larger than the threshold value. Or, where the second digital information represents a value specifying any number pre-assigned to the each sub block, the step of controlling determines that the block address represented by the first digital information is of a value equal to or larger than the threshold value; whereas where the second digital information represents a value other than the value specifying any number pre-assigned to the each sub block, the step of controlling determines that the block address represented by the first digital information is of a value smaller than the threshold value. The step of controlling specifies the block address and the number of the sub block based on the determination result.

In order to solve the above-described problems, an optical disc according to the present invention is an optical disc, in which a track on which data is recordable is divided into blocks each corresponding to a prescribed data amount, and each block is further divided into L pieces of sub blocks. On each sub block of the track, M-bit first digital information as a block address assigned to each block and N-bit second digital information as a sub block number assigned to each sub block are both recorded. Where a value of the block address is smaller than a prescribed first threshold value, the N-bit second digital information is assigned a value corresponding to the L pieces of sub blocks numbers, whereas where the value of the block address is equal to or larger than the prescribed first threshold value, the N-bit second digital information is assigned a value other than the value corresponding to the L pieces of numbers assigned where the value of the block address is smaller than the M'th power of 2.

The L may be larger than a maximum value represented by an N−1-bit digital value and smaller than a maximum value represented by an N-bit digital value.

The prescribed first threshold value may be a maximum value represented by an M-bit digital value.

Where the value of the block address is smaller than the prescribed first threshold value, the M-bit first digital information may be assigned the same value as the value of the block address; whereas where the value of the block address is equal to or larger than the prescribed first threshold value, the least significant N bits of the M-bit first digital information may be similarly assigned the value corresponding to the L pieces of sub block numbers assigned where the value of the block address is smaller than the prescribed first threshold value and the most significant M-N bits of the M-bit first digital information may be assigned a value of the least significant M-N bits of the block address.

The data to be recorded on the track may be divided into blocks, and further into a prescribed number of sectors. The data may be recorded on a recording target block of the track after fifth digital information is added thereto, the fifth digital information at least including both of third digital information representing a block address of the recording target block of the track and fourth digital information representing a sector number of a sector in the block.

The third digital information may be (M+1)-bit digital information, which may represent a value of a block address equal to or larger than the prescribed first threshold value.

The fifth digital information may be added to each two sectors among the plurality of sectors included in the data. The third digital information included in the fifth digital information may be M-bit digital information of the same number of bits as the first digital information pre-recorded on the track, and the third digital information may be assigned a value of the least significant M bits of the recording target block address. Where the value of the recording target block address is smaller than the prescribed first threshold value, the fourth digital information included in the fifth digital information may represent one of an even-numbered value and an odd-numbered value; whereas where the value of the recording target block address is equal to or larger than the prescribed first threshold value, the fourth digital information included in the fifth digital information may represent either an odd-numbered value or an even-numbered value which is different from in the case where the value of the block address is smaller than the prescribed first threshold value.

An optical disc apparatus according to the present invention is an optical disc apparatus for performing at data recording and data reproduction to and from an optical disc, in which a track on which data is recordable is divided into blocks each corresponding to a prescribed data amount, each block is further divided into L pieces of sub blocks, and on each sub block of the track, M-bit first digital information as a block address assigned to each block and N-bit second digital information as a sub block number assigned to each sub block are both recorded. The optical disc apparatus comprises laser recording/reproducing means for irradiating the track with laser light for performing data recording/reproduction and detecting the reflected light; address reproducing circuit means for reproducing the first digital information and the second digital information recorded on the track, based on a reproduction signal indicating the detected reflected light; recording/reproducing position control means for determining the block address and the sub block number based on the reproduced first digital information and the reproduced second digital information, and controlling a position in the track to be irradiated with the laser light by the laser recording/reproducing means; and data recording/reproducing means for controlling a power of the laser light radiation of the laser recording/reproducing means in order to perform data reproduction based on the reproduction signal indicating the detected reflected light or data recording to the track. Where the second digital information represents a value corresponding to the L pieces of sub block numbers, the recording/reproducing position control means determines that the block address represented by the first digital information is of a value smaller than the prescribed first threshold value and controls the position in the track; whereas where the second digital information represents a value other than the value corresponding to the L pieces of sub block numbers, the recording/reproducing position control means determines that the block address represented by the first digital information is of a value equal to or larger than the threshold value and controls the position in the track.

The L may be larger than a maximum value represented by an N−1-bit digital value and smaller than a maximum value represented by an N-bit digital value.

The prescribed first threshold value may be a maximum value represented by an M-bit digital value.

When determining that the value of the block address is smaller than the prescribed first threshold value, the recording/reproducing position control means may set the N-bit second digital information to be a value of the sub block number and may use the M-bit first digital information as the value of the block address; whereas when determining that the value of the block address is equal to or larger than the prescribed first threshold value, the recording/reproducing position control means may set the least significant N bits of the M-bit first digital information to be a value of the sub block number and may use the most significant M-N bits of the M-bit first digital information as the value of the block address.

When determining that the value of the block address is smaller than the prescribed first threshold value, the recording/reproducing position control means may use a value, obtained by adding 1 bit representing 0 to, and as a more significant bit than, the M-bit first digital information, as the value of the block address; whereas when determining that the value of the block address is equal to or larger than the prescribed first threshold value, the recording/reproducing position control means may use, as the value of the block address, a value obtained by adding (N+1)-bits to, and as more significant bits than, the most significant M-N bits of the M-bit first digital information, such that the values of the block addresses are continuous.

For recording the data, the data recording/reproducing means may divide the data to be recorded on the track into blocks, and further into a prescribed number of sectors, and may perform control of recording the data on a recording target block of the track after adding fifth digital information to the data, the fifth digital information at least including both of third digital information representing a block address of the recording target block of the track and fourth digital information representing a sector number of a sector in the block.

The third digital information may be (M+1)-bit digital information, which may represent a value of a block address equal to or larger than the prescribed first threshold value.

For recording the data, the data recording/reproducing means may add the fifth digital information to each two sectors among the plurality of sectors included in the data. The third digital information included in the fifth digital information may be M-bit digital information of the same number of bits as the first digital information pre-recorded on the track, and the third digital information may be assigned a value of the least significant M bits of a recording target block address on which data is to be recorded. Where the value of the recording target block address is smaller than the prescribed first threshold value, the fourth digital information included in the fifth digital information may represent one of an even-numbered value and an odd-numbered value; whereas where the value of the recording target block address is equal to or larger than the prescribed first threshold value, the fourth digital information included in the fifth digital information may represent either an odd-numbered value or an even-numbered value which is different from in the case where the value of the block address is smaller than the prescribed first threshold value.

The data may be divided into blocks, and further into a prescribed number of sectors. The data may be recorded on the recording target block of the track after fifth digital information is added thereto, the fifth digital information at least including both of third digital information representing a block address of the recording target block of the track and fourth digital information representing a sector number of a sector in the block. For reproducing the data, the data recording/reproducing means may extract the third digital information and the fourth digital information from the reproduced data. When the third digital information and the fourth digital information extracted from the data are acquired before the first digital information and the second digital information pre-recorded on the track are reproduced, the recording/reproducing position control means may control the position in the track to be reproduced using the third digital information and the fourth digital information extracted from the data.

The third digital information may be (M+1)-bit digital information, which may represent a value of a block address equal to or larger than the prescribed first threshold value.

The fifth digital information may be recorded on the track as being added to each two sectors of the data. Where the fourth digital information included in the fifth digital information represents an even-numbered (or odd-numbered) value, the recording/reproducing position control means may determine that the value of the block address is smaller than the prescribed first threshold value; whereas where the fourth digital information included in the fifth digital information represents an odd-numbered (or even-numbered) value, the recording/reproducing position control means may determine that the value of the block address is equal to or larger than the prescribed first threshold value.

When determining that the value of the block address extracted from the reproduced data is smaller than the prescribed first threshold value, the recording/reproducing position control means may use a value, obtained by adding 1 bit representing 0 to, and as a more significant bit than, the third digital information, as the value of the block address; whereas when determining that the value of the block address is equal to or larger than the prescribed first threshold value, the recording/reproducing position control means may use a value, obtained by adding 1 bit representing 1 to, and as a more significant bit than, the third digital information, as the value of the block address.

An optical disc recording/reproducing method according to the present invention is an optical disc recording/reproducing method for performing data recording/reproduction to and from an optical disc, in which a track on which data is recordable is divided into blocks each corresponding to a prescribed data amount, each block is further divided into L pieces of sub blocks, and on each sub block of the track, M-bit first digital information as a block address assigned to each block and N-bit second digital information as a sub block number assigned to each sub block are both recorded. The optical disc recording/reproducing method comprises a laser recording/reproducing step of irradiating the track with laser light for performing data recording/reproduction and detecting the reflected light; an address reproducing circuit step of reproducing the first digital information and the second digital information recorded on the track, based on a reproduction signal indicating the detected reflected light; a recording/reproducing position control step of determining the block address and the sub block number based on the reproduced first digital information and the reproduced second digital information, and controlling a position in the track to be irradiated with the laser light by the laser recording/reproducing step; and a data recording/reproducing step of controlling a power of the laser light radiation of the laser recording/reproducing step in order to perform data reproduction based on the reproduction signal indicating the detected reflected light or data recording to the track. Where the second digital information represents a value corresponding to the L pieces of sub block numbers, the recording/reproducing position control step determines that the block address represented by the first digital information is of a value smaller than the prescribed first threshold value and controls the position in the track; whereas where the second digital information represents a value other than the value corresponding to the L pieces of sub block numbers, the recording/reproducing position control step determines that the block address represented by the first digital information is of a value equal to or larger than the threshold value and controls the position in the track.

The L may be larger than a maximum value represented by an N−1-bit digital value and smaller than a maximum value represented by an N-bit digital value.

The prescribed first threshold value may be a maximum value represented by an M-bit digital value.

When determining that the value of the block address is smaller than the prescribed first threshold value, the recording/reproducing position control step may set the N-bit second digital information to be a value of the sub block number and may use the M-bit first digital information as the value of the block address; whereas when determining that the value of the block address is equal to or larger than the prescribed first threshold value, the recording/reproducing position control step may set the least significant N bits of the M-bit first digital information to be a value of the sub block number and may use the most significant M-N bits of the M-bit first digital information as the value of the block address.

When determining that the value of the block address is smaller than the prescribed first threshold value, the recording/reproducing position control step may use a value, obtained by adding 1 bit representing 0 to, and as a more significant bit than, the M-bit first digital information, as the value of the block address; whereas when determining that the value of the block address is equal to or larger than the prescribed first threshold value, the recording/reproducing position control step may use, as the value of the block address, a value obtained by adding (N+1)-bits to, and as more significant bits than, the most significant M-N bits of the M-bit first digital information, such that the values of the block addresses are continuous.

For recording the data, the data recording/reproducing step may divide the data to be recorded on the track into blocks, and further into a prescribed number of sectors, and may perform control of recording the data on a recording target block of the track after adding fifth digital information to the data, the fifth digital information at least including both of third digital information representing a block address of the recording target block of the track and fourth digital information representing a sector number of a sector in the block.

The third digital information may be (M+1)-bit digital information, which may represent a value of a block address equal to or larger than the prescribed first threshold value.

For recording the data, the data recording/reproducing step may add the fifth digital information to each two sectors among the plurality of sectors included in the data. The third digital information included in the fifth digital information may be M-bit digital information of the same number of bits as the first digital information pre-recorded on the track, and the third digital information may be assigned a value of the least significant M bits of a recording target block address on which data is to be recorded. Where the value of the recording target block address is smaller than the prescribed first threshold value, the fourth digital information included in the fifth digital information may represent one of an even-numbered value and an odd-numbered value; whereas where the value of the recording target block address is equal to or larger than the prescribed first threshold value, the fourth digital information included in the fifth digital information may represent either an odd-numbered value or an even-numbered value which is different from in the case where the value of the block address is smaller than the prescribed first threshold value.

The data may be divided into blocks, and further into a prescribed number of sectors. The data may be recorded on the recording target block of the track after fifth digital information is added thereto, the fifth digital information at least including both of third digital information representing a block address of the recording target block of the track and fourth digital information representing a sector number of a sector in the block. For reproducing the data, the data recording/reproducing step may extract the third digital information and the fourth digital information from the reproduced data. When the third digital information and the fourth digital information extracted from the data are acquired before the first digital information and the second digital information pre-recorded on the track are reproduced, the recording/reproducing position control step may control the position in the track to be reproduced using the third digital information and the fourth digital information extracted from the data.

The third digital information may be (M+1)-bit digital information, which may represent a value of a block address equal to or larger than the prescribed first threshold value.

The fifth digital information may be recorded on the track as being added to each two sectors of the data. Where the fourth digital information included in the fifth digital information represents an even-numbered (or odd-numbered) value, the recording/reproducing position control step may determine that the value of the block address is smaller than the prescribed first threshold value; whereas where the fourth digital information included in the fifth digital information represents an odd-numbered (or even-numbered) value, the recording/reproducing position control step may determine that the value of the block address is equal to or larger than the prescribed first threshold value.

When determining that the value of the block address extracted from the reproduced data is smaller than the prescribed first threshold value, the recording/reproducing position control step may use a value, obtained by adding 1 bit representing 0 to, and as a more significant bit than, the third digital information, as the value of the block address; whereas when determining that the value of the block address is equal to or larger than the prescribed first threshold value, the recording/reproducing position control step may use a value, obtained by adding 1 bit representing 1 to, and as a more significant bit than, the third digital information, as the value of the block address.

An integrated circuit according to the present invention is an integrated circuit for detecting a block address and a sub block number from a reproduction signal obtained by reproducing an optical disc, in which a track on which data is recordable is divided into blocks each corresponding to a prescribed data amount, each block is further divided into L pieces of sub blocks, and on each sub block of the track, M-bit first digital information as a block address assigned to each block and N-bit second digital information as a sub block number assigned to each sub block are both recorded. The integrated circuit comprises demodulation means for demodulating the first digital information and the second digital information recorded on the track, based on the reproduction signal; and address determination means for determining the block address and the sub block number based on the demodulated first digital information and the demodulated second digital information. Where the second digital information represents a value corresponding to the L pieces of sub block numbers, the address determination means determines that the block address represented by the first digital information is of a value smaller than the prescribed first threshold value; whereas where the second digital information represents a value other than the value corresponding to the L pieces of sub block numbers, the address determination means determines that the block address represented by the first digital information is of a value equal to or larger than the threshold value.

The L may be larger than a maximum value represented by an N−1-bit digital value and smaller than a maximum value represented by an N-bit digital value.

The prescribed first threshold value may be a maximum value represented by an M-bit digital value.

When determining that the value of the block address is smaller than the prescribed first threshold value, the address determination means may set the N-bit second digital information to be a value of the sub block number and may determine the M-bit first digital information as the value of the block address; whereas when determining that the value of the block address is equal to or larger than the prescribed first threshold value, the address determination means may set the least significant N bits of the M-bit first digital information to be a value of the sub block number and may determine the most significant M-N bits of the M-bit first digital information as the value of the block address.

When determining that the value of the block address is smaller than the prescribed first threshold value, the address determination means may determine a value, obtained by adding 1 bit representing 0 to, and as a more significant bit than, the M-bit first digital information, as the value of the block address; whereas when determining that the value of the block address is equal to or larger than the prescribed first threshold value, the address determination means may determine, as the value of the block address, a value obtained by adding (N+1)-bits to, and as more significant bits than, the most significant M-N bits of the M-bit first digital information, such that the values of the block addresses are continuous.

Data recording means for generating a recording signal for recording the data may be further provided. The data recording means may divide the data to be recorded on the track into blocks, and further into a prescribed number of sectors, and may output a recording signal for recording the data on a recording target block of the track after adding fifth digital information to the data, the fifth digital information at least including both of third digital information representing a block address of the recording target block of the track and fourth digital information representing a sector number of a sector in the block.

The third digital information may be (M+1)-bit digital information, which may represent a value of a block address equal to or larger than the prescribed first threshold value.

The data recording means may add the fifth digital information to each two sectors among the plurality of sectors included in the data. The third digital information included in the fifth digital information may be M-bit digital information of the same number of bits as the first digital information pre-recorded on the track, and the third digital information may be assigned a value of the least significant M bits of a recording target block address on which data is to be recorded. Where the value of the recording target block address is smaller than the prescribed first threshold value, the fourth digital information included in the fifth digital information may represent one of an even-numbered value and an odd-numbered value; whereas where the value of the recording target block address is equal to or larger than the prescribed first threshold value, the fourth digital information included in the fifth digital information may represent either an odd-numbered value or an even-numbered value which is different from in the case where the value of the block address is smaller than the prescribed first threshold value.

The data may be divided into blocks, and further into a prescribed number of sectors. The data may be recorded on the recording target block of the track after fifth digital information is added thereto, the fifth digital information at least including both of third digital information representing a block address of the recording target block of the track and fourth digital information representing a sector number of a sector in the block. Data reproducing means for reproducing the data from the reproduction signal may be further provided. The data reproducing means may extract the third digital information and the fourth digital information from the reproduced data. When the third digital information and the fourth digital information extracted from the data are acquired before the first digital information and the second digital information pre-recorded on the track are reproduced, the address determination means may determine the address using the third digital information and the fourth digital information extracted from the data.

The third digital information may be (M+1)-bit digital information, which may represent a value of a block address equal to or larger than the prescribed first threshold value.

The fifth digital information may be recorded on the track as being added to each two sectors of the data. Where the fourth digital information included in the fifth digital information represents an even-numbered (or odd-numbered) value, the address determination means may determine that the value of the block address is smaller than the prescribed first threshold value; whereas where the fourth digital information included in the fifth digital information represents an odd-numbered (or even-numbered) value, the address determination means may determine that the value of the block address is equal to or larger than the prescribed first threshold value.

When determining that the value of the block address extracted from the reproduced data is smaller than the prescribed first threshold value, the address determination means may determine a value, obtained by adding 1 bit representing 0 to, and as a more significant bit than, the third digital information, as the value of the block address; whereas when determining that the value of the block address is equal to or larger than the prescribed first threshold value, the address determination means may determine a value, obtained by adding 1 bit representing 1 to, and as a more significant bit than, the third digital information, as the value of the block address.

According to the present invention, where the value of the block address is smaller than the M'th power of 2, the N-bit second digital information is assigned a value corresponding to the L pieces of sub block numbers; whereas where the value of the block address is equal to or larger than the M'th power of 2, the N-bit second digital information is assigned a value other than the value corresponding to the L pieces of numbers assigned where the value of the block address is smaller than the M'th power of 2. Owing to this, it is indicated whether or not the value of the block address represented by M-bit first digital information is smaller than the M'th power of 2, while the total number of bits remains the same. Thus, even a value equal to or larger than the M'th power of 2 can be represented.

The amount of digital information to be recorded on each sub block remains the same as in the conventional art, and an apparatus conventionally used can be used by merely changing the value to be recorded. Therefore, for producing an optical disc having an enlarged recording capacity, the conventionally used apparatus can be used without significant changes and so an increase of the production cost can be avoided.

Also regarding an optical disc apparatus for recording data to or reproducing data from such an optical disc, the processing of reproducing the digital information recorded on each sub block remains the same as in the conventional art. An apparatus conventionally used can be used by merely changing the method of processing the value of the reproduced digital information. Therefore, it is not necessary to change the hardware for reproducing the digital information, and so an increase of the cost due to a complicated system or an enlarged scale of the hardware can be avoided. The address area represented by the conventional address format remains the same as in the conventional art, and so the compatibility can be kept easily.

A data address to be added to the data to be recorded can also represent a block address equal to or larger than the M'th power of 2.

DETAILED DESCRIPTION OF PREFERRED EMBODIMENTS

Hereinafter, embodiments of an optical disc or an optical disc apparatus according to the present invention will be described

Embodiment 1

Figure 1:
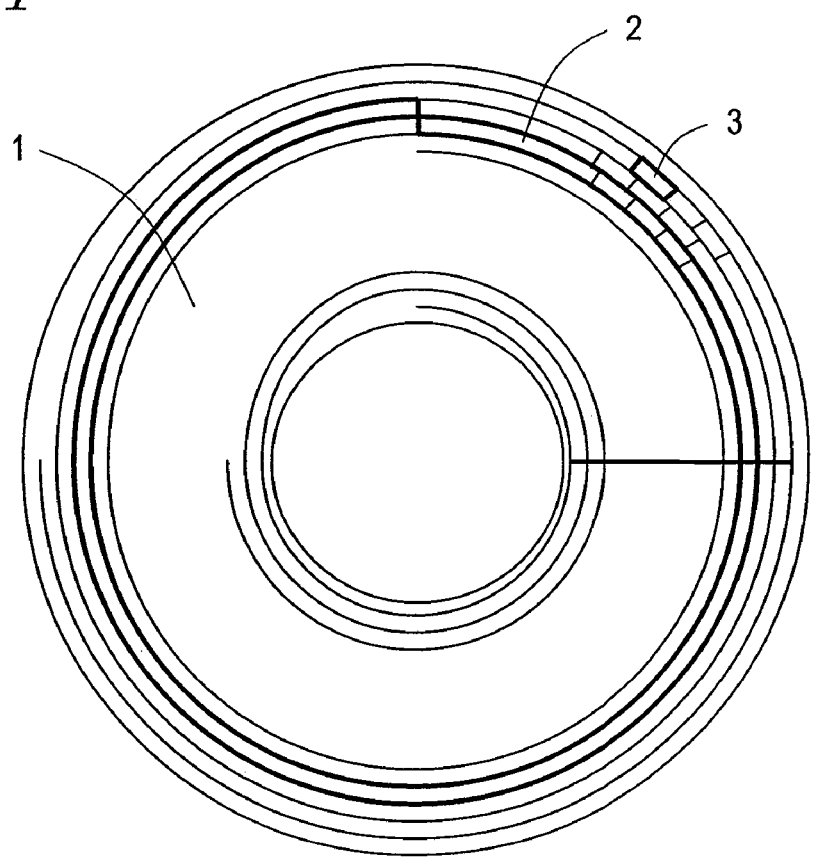
FIG. 1 shows a physical structure of an optical disc 1.

FIG. 1 shows a physical structure of an optical disc 1. On a discus-shaped optical disc 1, a great number of tracks 2 are formed in a spiral, for example. In each track 2, a great number of tiny sectors are formed. As described later, data is recorded on each track 2 in units of blocks 3 each having a predetermined size.

In the optical disc 1 according to this embodiment, the recording capacity of each information recording layer is expanded as compared with the conventional optical disc. The recording capacity is expanded by, for example, shortening the length of recording marks to be recorded on the optical disc.

Figure 13:
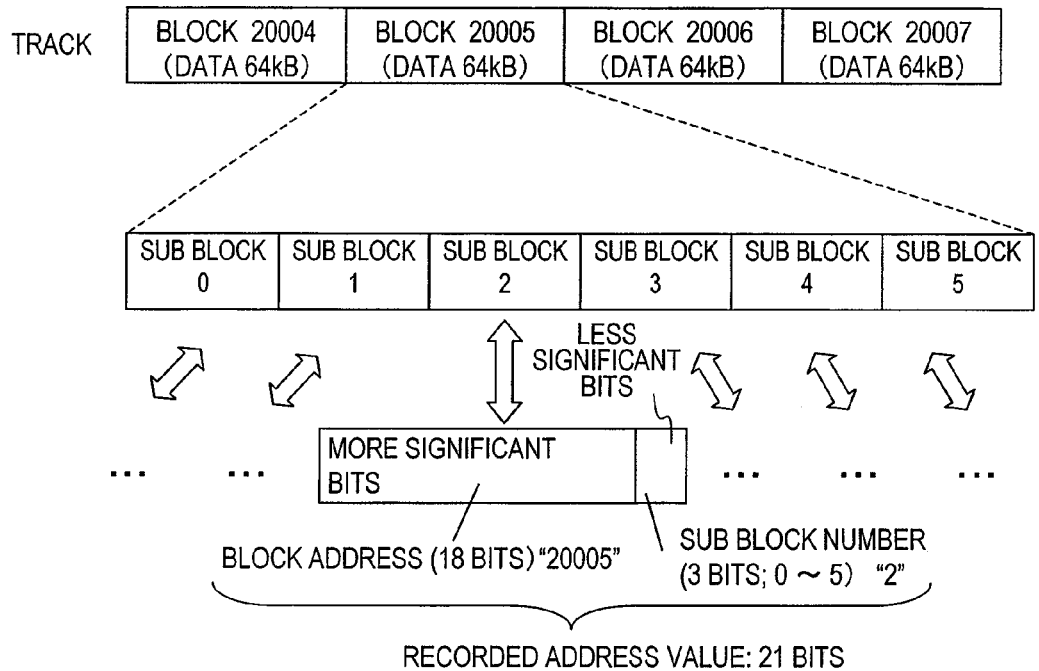
FIG. 13 shows an example of a format of track addresses pre-recorded on a track of a conventional optical disc.
Figure 14:
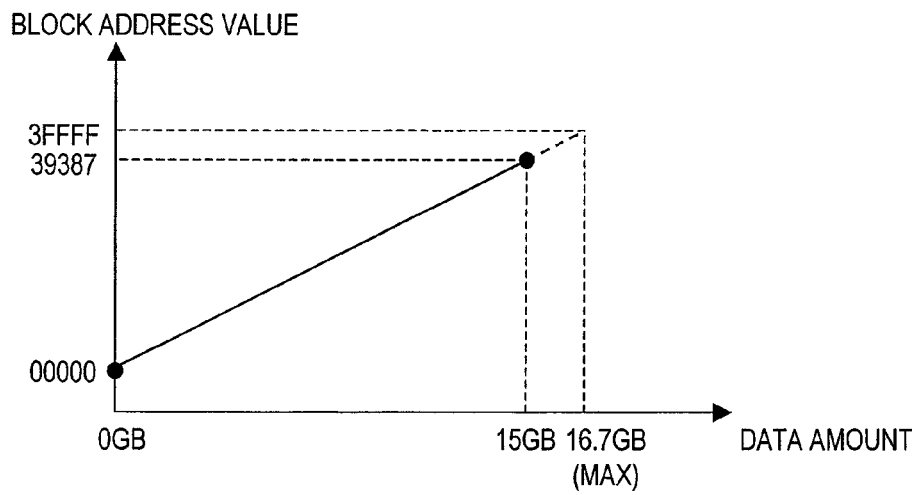
FIG. 14 shows the relationship between a range of addresses which can be represented by an address format of a conventional optical disc and the data recording capacity.
Figure 15:
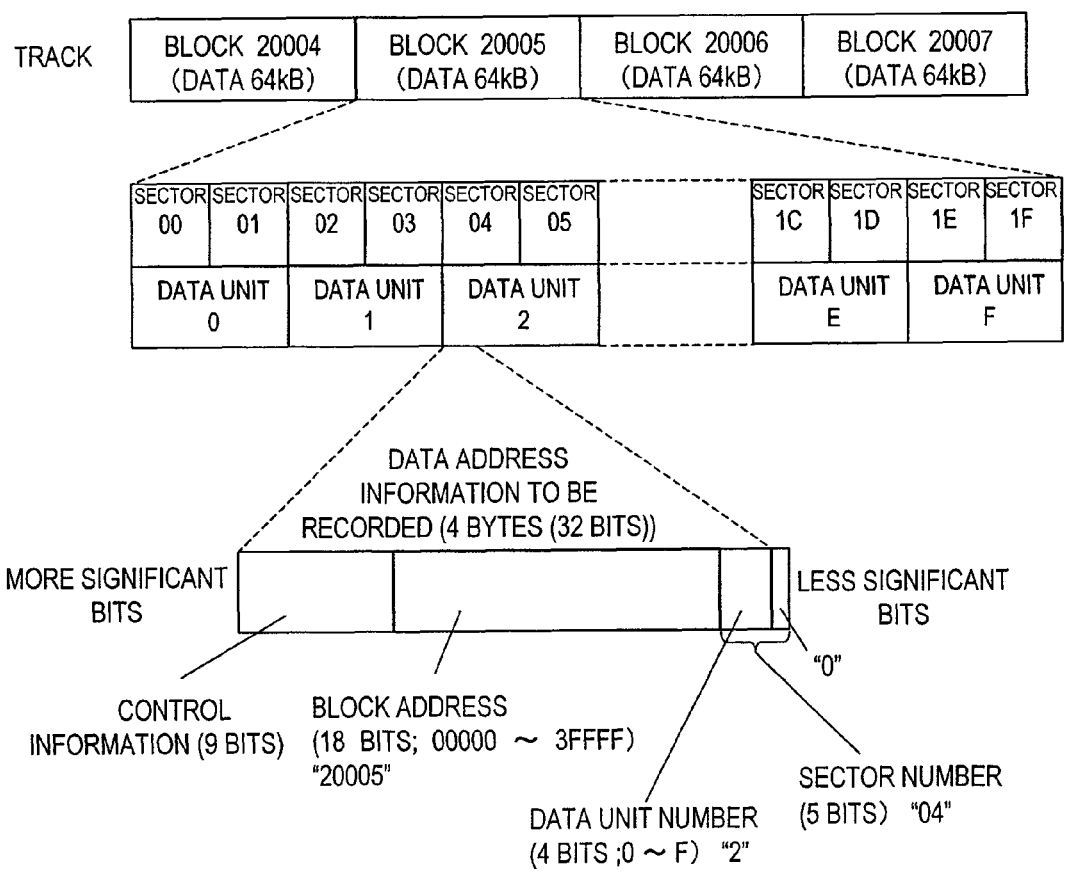
FIG. 15 shows an address format of data addresses to be added to data at the time of data recording to a conventional optical disc.

In correspondence with the expansion of the recording capacity, an address description method is also expanded in this embodiment. For example, it is assumed that the recording capacity of one information recording layer in the conventional optical disc is 16.7 GB (FIG. 14). In this case, a block address for representing a track address or a data address is represented by 18 bits (FIG. 13 and FIG. 15). The address value is described by 21 bits in total, which include a block address of the most significant 18 bits and an address flag of the least significant 3 bits.

By contrast, the recording capacity of one information recording layer in the optical disc 1 according to this embodiment is expanded to 21 GB. A block address for representing a track address or a data address is described by the following method.

First, an address corresponding to a recording area of 0 to 16.7 GB is described by the same method as the conventional method. Since compatibility with the conventional optical disc is guaranteed, a currently existing apparatus can read data from, or write data to, the optical disc according to this embodiment.

By contrast, an address corresponding to a recording area exceeding 16.7 GB (hereinafter, referred to as the "expanded area") is described as follows. (1) A value which cannot be described for the conventional optical disc is described as a least significant 3-bit address flag to indicate that an address of the expanded area is described; and (2) a part of the address specifying the expanded area is represented by the most significant 18 bits. The reason why the "part of the address" is represented is that the entire address cannot be described with 18 bits. Therefore, for reading the expanded area, special processing of specifying the complete address needs to be performed. This processing will be described later as "addition of a virtual bit(s)".

In the above embodiment, the address value on the track may be recorded by wobbling of the track, inter-track pits, or pits on the track.

FIGS. 2(A) and (B) each show a format of addresses pre-recorded on the track 2 of the optical disc 1 according to this embodiment.

Data is recorded on the track 2 in units of error-correction-coded blocks 3 each having a data amount of 64 kB. The track 2 is assigned block addresses in units of blocks.

Each block is divided into six sub blocks, and the sub blocks are assigned sub block numbers of 0 through 5 sequentially from the first sub block. In the track 2, a 21-bit address value including a block address value and a sub block number is pre-recorded on each sub block. The "virtual bit(s)" shown in the figures is added when an optical disc apparatus according to Embodiment 2 described later performs processing of specifying an address, and is not described in the optical disc 1.

FIG. 2(A) shows an address format according to this embodiment for an area having a block address value of 00000 through 3FFFF.

The 21-bit address value recorded on each sub block represents a block address (the most significant 18 bits) and an address flag (the least significant 3 bits). As the 18-bit block address, a block address value of 00000 through 3FFFF corresponding to each block is recorded as it is. As the 3-bit address flag, a sub block number of 0 through 5 corresponding to each sub block is recorded as it is.

As described above, one block includes six sub blocks and so the sub block numbers are integers in the range of 0 through 5. In this embodiment, in the case where the number represented by the 3-bit address flag is an integer in the range of 0 through 5, the most significant 18 bits indicate a block address of 00000 through 3FFFF.

The "3 bits" of the address flag is defined as a number of bits which are capable of representing the number of the sub blocks of 6 (numerical values of 0 through 5). Generally describing, when an address flag is defined as including "N bits", the number of sub blocks of L is a numerical value is larger than the maximum value represented by a digital value of N−1 bits and smaller than the maximum value represented by a digital value of N bits.

As described above, where the block address value is in the range of 00000 through 3FFFF which can be represented by 18 bits, the contents of the 21-bit address value recorded on the optical disc 1 according to this embodiment are the same as those of an address format of the conventional optical disc. Owing to this, the optical disc 1 according to this embodiment can easily keep compatibility with the conventional optical disc.

FIG. 2(B) shows an address format according to this embodiment for an expanded area having a block address value of 40000 through 4FFFF.

Like in FIG. 2(A), the track 2 includes the blocks 3 and each block 3 includes six sub blocks 0 through 5. Like in the area having a block address value of 00000 through 3FFFF, the 21-bit address value recorded on each sub block includes a 18-bit block address and a 3-bit address flag.

In FIG. 2(B), however, "6" or "7" is recorded as the 3-bit address flag. As described above regarding FIG. 2(A), both "6" and "7" are values impossible as sub block numbers. Therefore, where the 3-bit address flag represents "6" or "7", the block address value is not any of 00000 through 3FFFF, namely, the block address value is equal to or greater than 40000. In other words, where a numerical value other than 0 through 5 is described as the 3-bit address flag, such an address flag can be defined as a flag indicating that an expanded area is present. In the area with a block address value of 40000 through 47FFF, "6" is recorded as the address flag; and in the area with a block address value of 48000 through 4FFFF, "7" is recorded as the address flag.

The 18 bits located as more significant bits than the 3-bit address flag are divided into the least significant 3 bits for recording a sub block number and the most significant 15 bits for recording a block address value. In this manner, these two parts of bits are each used as indicating a new meaning. As the least significant 3 bits, the sub block number of each sub block of 0 through 5 is recorded as it is. As the most significant 15 bits, the least significant 15-bit value of the block address value is recorded as it is. Such a value is 0000 through 7FFF in correspondence with the block address value of 40000 through 47FFF, and is also 0000 through 7FFF in correspondence with the block address value of 48000 through 4FFFF.

As described above, the 3-bit address flag is used differently depending on whether the corresponding block address value is smaller than 40000 which can be represented with 18 bits, or equal to or larger than 40000 which cannot be represented with 18 bits. Owing to this, the space of the block addresses can be expanded without changing the total number of bits of the address value to be recorded for each sub block from 21.

Figure 3:
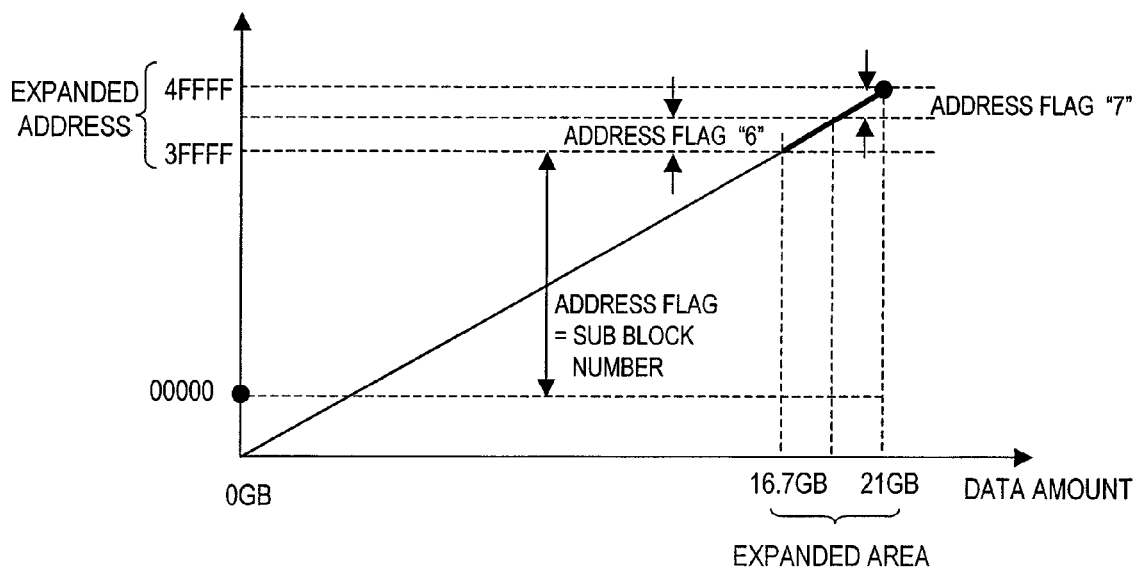
FIG. 3 shows the relationship between the data recording capacity of an optical disc and the values recorded as a block address and an address flag.

FIG. 3 shows the relationship between the data recording capacity of an optical disc and the values recorded as the block address and the address flag. It can be seen that conventionally, the address value of 21 bits can only be used for a data recording capacity of 16.7 GB; whereas according to this embodiment, the address value of 21 bits can be used for a data recording capacity of 21 GB.

The total number of bits of the address value to be recorded on each sub block remains 21. Therefore, an optical disc production apparatus used for the conventional art can also be used in this embodiment merely by changing the address values to be recorded. Similarly, as an optical disc apparatus for performing recording to or reproduction from the optical disc according to the present invention, a conventionally used apparatus can be made usable easily, merely by changing the determination processing performed on a demodulated value in the case where the block address value is equal to or greater than 40000. There is no need to change the circuit for demodulating an address value from a reproduction signal.

In correspondence with the expansion of the method for describing an address pre-recorded on the track 2 of the optical disc 1, the method for describing an address to be added to data also needs to be changed. Hence, now, a format of an address to be added to data will be described.

FIGS. 4(A) and (B) each show an address format of data addresses to be added to data, which is to be recorded on the optical disc according to this embodiment.

Data is divided into blocks each having 64 kB. Each block is recorded as being divided into 32 sectors each having 2 kBa. Two sectors are collectively treated as one data unit. At the start of each data unit, 4-byte (32-bit) data address information is inserted and recorded on the track. As described above, the conventional data address information includes 32 bits in total including a 5-bit sector number, an 18-bit block address value, and 9-bit control information which is used, for example, as layer information in the case where there are a plurality of recording layers. The 18-bit block address value is the same as the value of the block address pre-recorded on the track. A block address value of a target block, on which data is to be recorded, is assigned as the 18-bit block address value. The digital information representing the block address is of 18 bits, and so can only represent a block address of 00000 through 3FFFF.

FIG. 4(A) shows a data address format according to this embodiment in which block address values of 00000 through 4FFFF are necessary. As control information for describing layer information or the like, 9 bits are usable. However, in this embodiment, 1 bit of the 9 bits is treated as an additional bit located at the position of the most significant bit of the block address. Such a manner of treatment is possible because it is not necessary to use all the 9 bits as the control information. Owing to this, the values of 00000 through 4FFFF can represented as a block address value of 19 bits in total.

FIG. 4(B) shows another data address format according to this embodiment which represents a block address value of 00000 through 4FFFF in a different manner from that of FIG. 4(A). Since the data address is added to the start of each data unit, an assigned sector number is always even-numbered. Therefore, in a conventional optical disc, the value of the least significant bit is always 0. Hence, the 5 bits conventionally representing the sector number is divided into a data address flag represented by the least significant 1 bit and a data unit number represented by the most significant 4 bits. The data address flag is 0 when the value of the block address to be recorded is 00000 through 3FFFF, and is 1 when the value of the block address to be recorded is 40000 through 4FFFF.

As described above, the space of the block addresses of the data addresses can also be expanded in correspondence with the block addresses pre-recorded on the track 2.

Even as compared with the conventional optical disc, the total number of bits remains the same. Accordingly, as an optical disc apparatus for performing data recording to or data reproduction from the optical disc according to the present invention, a conventionally used apparatus can be used with the same circuit for demodulating a data address value from a reproduction signal, without significantly increasing the cost. An optical disc according to this embodiment has high affinity with the conventional optical disc and can be introduced easily.

In the above-described embodiment, specific examples of the number of bits of the address format and the like are described. The present invention is not limited to these examples. In Embodiment 3 later, address formats with other numbers of bits will be described.

In the above-described embodiment, the value of the address flag is 6 in an area having a block address of 40000 through 47FFF, and is 7 in an area having a block address of 48000 through 4FFFF. The present invention is not limited to this.

In the above-described embodiment, the optical disc on which data is recordable is described. The present invention is also applicable to a reproduction-only optical disc having data pre-recorded thereon.

In the above-described embodiment, where the data address flag represents 1, the block address is equal to or greater than 40000. The present invention is not limited to this. Where the data address flag represents 0, the block address may be equal to or greater than 40000. It is preferable, however, to pre-define in which case, among the case where the data address flag represents 0 and the case where the data address flag represents 1 (more generally, among the case where the data address flag represents an even-numbered value and the case where the data address flag represents an odd-numbered value), the "block address is equal to or greater than 40000".

Embodiment 2

Figure 5:
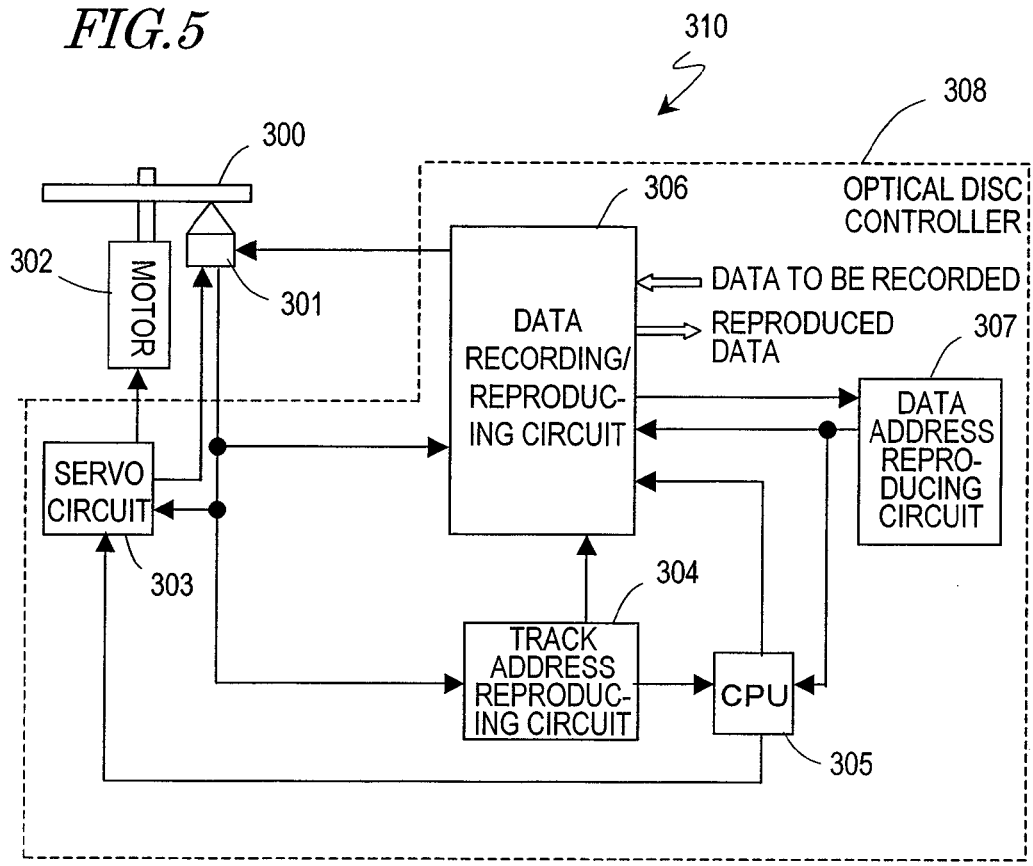
FIG. 5 is a block diagram showing a structure of an optical disc apparatus 310 according to Embodiment 2.

FIG. 5 is a block diagram showing a structure of an optical disc apparatus 310 according to this embodiment. The optical disc apparatus 310 is capable of reproducing data from an optical disc 300 and recording data on the optical disc 300. The function of recording data is not indispensable, and the optical disc apparatus 310 may be a reproduction-only optical disc player. In such a case, among functions of a data recording/reproducing circuit of the optical disc apparatus 310 described later, the function of receiving data to be recorded (hereinafter "recording data") and writing the recording data on the optical disc 300 is not necessary.

Figure 2:
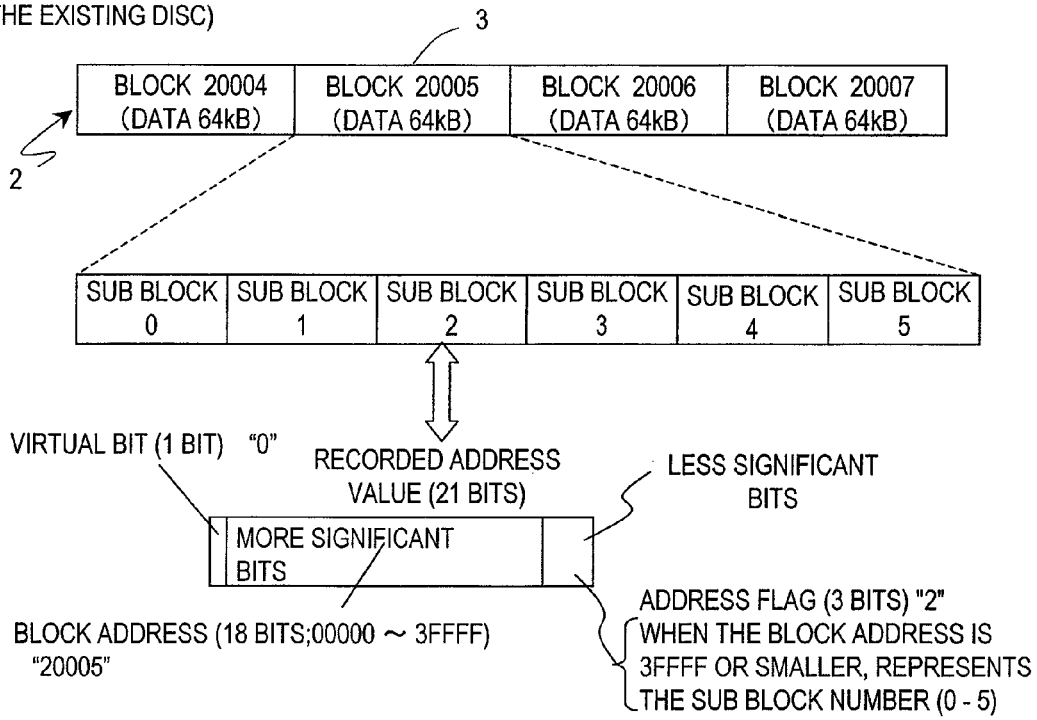
FIGS. 2(A) and (B) each show a format of addresses pre-recorded on a track 2 of the optical disc 1 according to an embodiment of the present invention.
Figure 2:
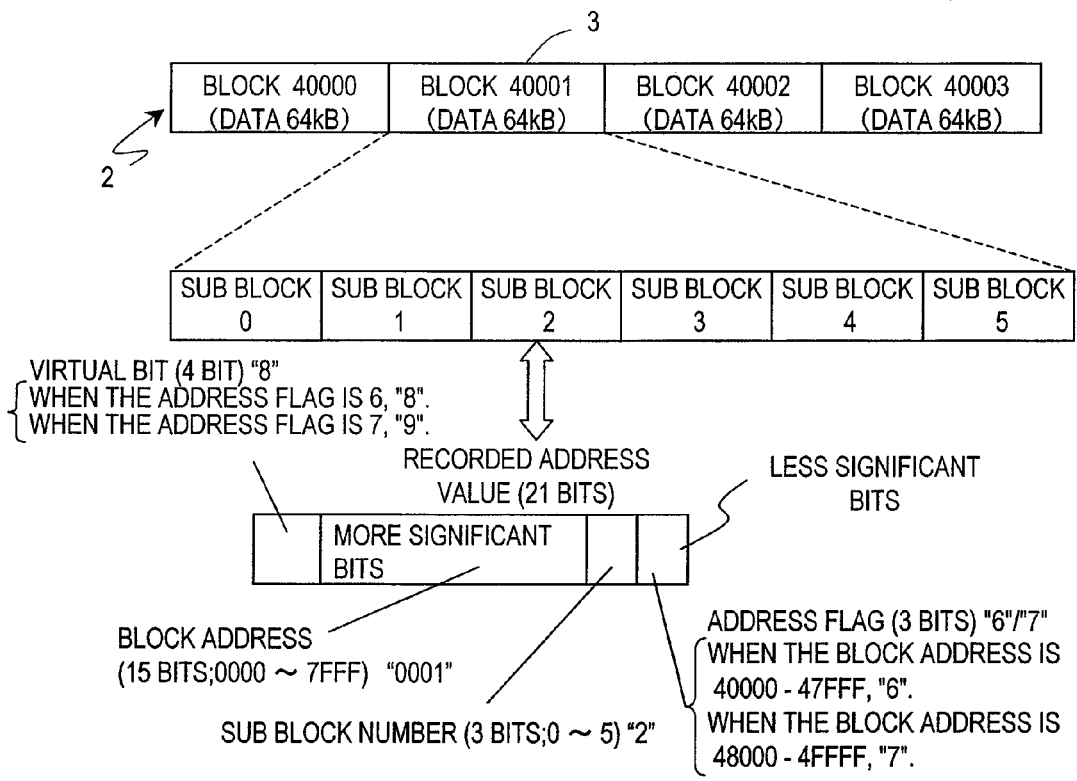

The structure of the optical disc 300 is the same as that of the optical disc 1 shown in FIG. 1. Accordingly, the tracks of the optical disc 300 have addresses pre-recorded in the format as shown in FIG. 2. The tracks are formed in a wobbling shape, and the address values are recorded by a change in the frequency or phase of the wobbling shape.

The optical disc apparatus 310 includes an optical head 301, a motor 302, a servo circuit 303, a track address reproducing circuit 304, a CPU 305, a data recording/reproducing circuit 306, and a data address reproducing circuit 307.

The servo circuit 303, the track address reproducing circuit 304, the CPU 305, the data recording/reproducing circuit 306, and the data address reproducing circuit 307 are mounted as a one-chip circuit (optical disc controller) 308. It is not necessary that all these elements are incorporated into one chip. For example, the servo circuit 303 does not need to be incorporated. The track address reproducing circuit 304 may be incorporated into the optical head 301. Alternatively, these elements may be provided as separate circuits instead of being incorporated into one chip. Note that the optical disc 300 is dismountable from the optical disc apparatus 310 and so is not an indispensable element of the optical disc apparatus 310.

The optical head 301 irradiates the optical disc 300 with a light beam, detects the amount of the light reflected by the optical disc 300 while scanning the track, and outputs an electric signal (reproduction signal) in accordance with the amount of the reflected light. The optical head 301 includes a light source for emitting the light beam, a lens for collecting the light beam, and a light receiving section for receiving the light beam reflected by an information recording layer of the optical disc 300 and outputting the reproduction signal, although none of these elements is shown.

The motor 302 rotates the optical disc 300 at a specified rotation rate.

The servo circuit 303 generates a servo error signal in accordance with the light collection state of the light beam on the track, based on the reproduction signal from the optical head 301, and performs control using the servo error signal such that the light collection state of the light beam from the optical head 301 on the track and the scanning state of the track are optimal. The servo circuit 303 also controls the radial position on the optical disc 300 (for example, the position in the track) to be irradiated with the light beam and the rotation rate of the motor 302 to be optimal.

The track address reproducing circuit 304 extracts a wobble signal in accordance with the wobbling of the track of the optical disc 300, from the reproduction signal output from the optical head 301, and demodulates a 21-bit address value pre-recorded on the track based on the wobble signal. The track address reproducing circuit 304 also detects the synchronization position on the track for each block and each sub block.

The CPU 305 acquires the address value demodulated by the track address reproducing circuit 304, instructs the servo circuit 303 to search for a block which is to be used for data recording and reproduction, and issues an instruction to the data recording/reproducing circuit 306 to perform a recording operation or a reproduction operation at the position of the block obtained by the search. Thus, the data recording/reproducing circuit 306 controls the optical head 301 to output the laser light at a radiation power suitable to the recording operation or the reproduction operation to be performed.

In this embodiment, as described later with reference to FIG. 6, the CPU 305 performs calculation processing on the address value acquired from the track address reproducing circuit 304. Alternatively, this determination processing may be performed by the track address reproducing circuit 304.

When instructed by the CPU 305 to record data, the data recording/reproducing circuit 306 processes the recording data with addition of an error correction code, addition of a data address in accordance with a prescribed format and data modulation, and generates a recording signal. The data recording/reproducing circuit 306 controls the intensity of the light beam from the optical head 301, such that a mark in accordance with the recording signal is recorded on a specified block of the track, in compliance with the timing of the synchronization position detected by the track address reproducing circuit 304. Thus, the data is recorded on an information recording layer of the optical disc 300.

When instructed by the CPU 305 to reproduce data, the data recording/reproducing circuit 306 extracts a data signal in accordance with a mark recorded on a specified block of the track of the optical disc 300 based on the reproduction signal output from the optical head 301, in compliance with the timing of the synchronization position detected by the track address reproducing circuit 304. The data recording/reproducing circuit 306 then demodulates the data from the data signal in accordance with the above-mentioned data modulation of the recording operation, and performs error correction processing to output reproduction data.

At the time of the reproduction operation performed by the data recording/reproducing circuit 306, the data address reproducing circuit 307 extracts a data address added at the time of data recording, from the data demodulation result. The data address reproducing circuit 307 then detects a timing shift of the data demodulation or corrects the timing when abnormality occurs to the data signal due to a flaw on the track or the like.

Now, with reference to FIG. 6, the determination processing (calculation processing) performed by the CPU 305 on an address value acquired from the track address reproducing circuit 304 will be described. FIG. 6 is a flowchart showing a procedure of the determination processing performed by the optical disc apparatus 310.

The address format of the addresses pre-recorded on the track of the optical disc 300 (also referred to as "medium-added addresses") is as shown in FIG. 2(A) or FIG. 2(B) as described above.

First in step S1, the CPU 305 refers to the address value acquired from the track address reproducing circuit 304 to specify the value of the least significant 3-bit address flag of the demodulated 21-bit address value. The value of the address flag may be either one of (1) through (3): (1) an integer in the range of 0 through 5, (2) 6 and (3) 7.

Where the address flag value is in the range of 0 through 5, the address format is as shown in FIG. 2(A). In step S11, the CPU 305 determines that the address flag value represents a sub block number. The CPU 305 further determines that the block address value is in the range of 00000 through 3FFFF, and determines that the value of the remaining most significant 18 bits is the value of the least significant 18 bits of a block address. In step S12, the CPU 305 adds one bit of "0" to the position of a more significant bit than the 18 bits as a virtual bit to form a block address value of 19 bits in total.

Where the address flag value is 6, the address format is as shown in FIG. 2(B). In step S21, the CPU 305 determines that 3 bits at the positions of more significant bits than the address flag represent a sub block number, that the block address value is in the range of 40000 through 47FFF, and that the value of the remaining most significant 15 bits is the value of the least significant 15 bits of the block address, i.e., 0000 through 7FFF. In step S22, the CPU 305 adds 4 virtual bits at the positions of more significant bits than the 15-bit value. Where the address flag value is 6, the CPU 305 makes this value 8 (hexadecimal notation) to form a block address value of 19 bits in total. In FIG. 2(B), for example, when the address flag represents "6", the recorded 21-bit address value is 000056 (hexadecimal notation). However, owing to the above-described determination processing, the block address is interpreted as 40001 and the sub block number is interpreted as 2.

Also where the address flag value is 7, the address format is as shown in FIG. 2(B). In step S31, the CPU 305 determines that 3 bits at the positions of more significant bits than the address flag represent a sub block number. The CPU 305 determines that the block address value is in the range of 48000 through 4FFFF, and that the value of the remaining most significant 15 bits is the value of the least significant 15 bits of the block address, i.e., 0000 through 7FFF. In step S32, the CPU 305 adds 4 virtual bits to the positions of more significant bits than the 15-bit value. Where the address flag represents 7, the CPU 305 makes this value 9 (hexadecimal notation) to form a block address value of 19 bits in total. For example, when the recorded 21-bit address value is 000057 (hexadecimal notation), the block address is interpreted as 48001 and the sub block number is interpreted as 2 owing to the above-described determination processing.

Figure 7:
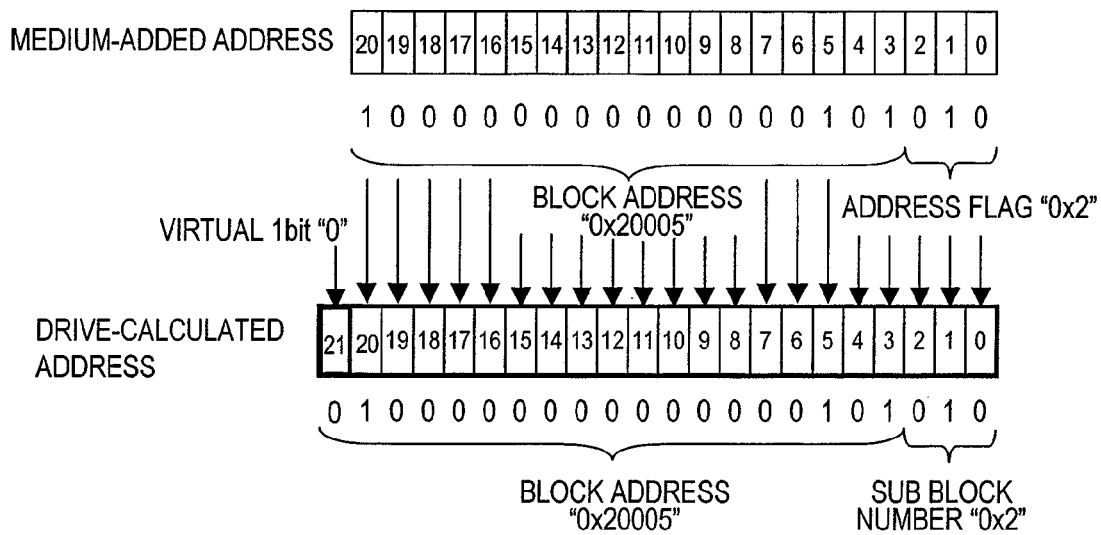
FIGS. 7(A) and (B) each show the correspondence between a medium-added address and an address calculated by the optical disc apparatus 310 (drive-calculated address).
Figure 7:
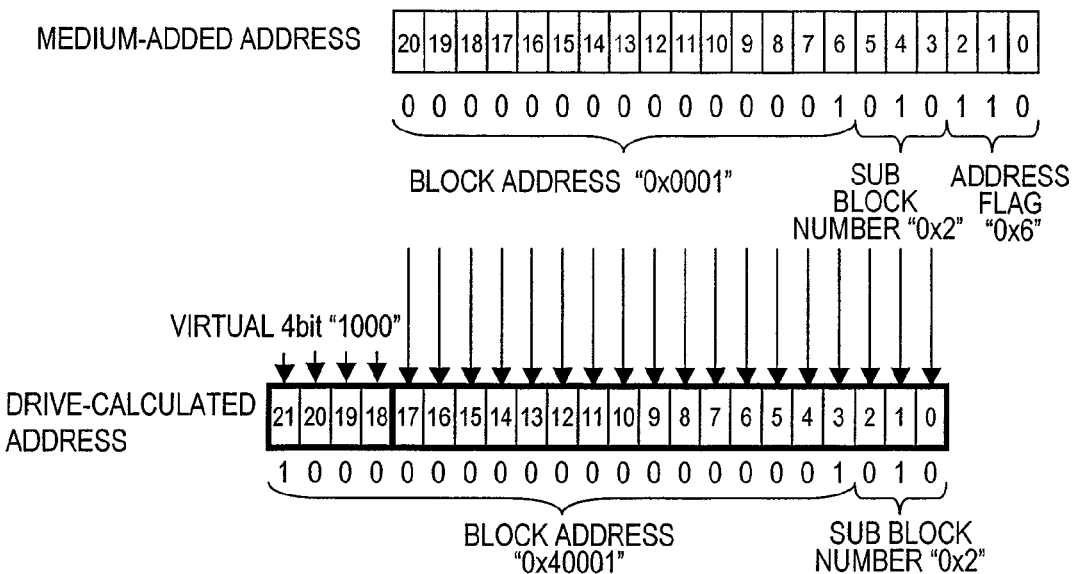

FIGS. 7(A) and (B) each show the correspondence between a medium-added address and an address calculated by the optical disc apparatus 310 (hereinafter, referred to as a "drive-calculated address").

FIG. 7(A) shows the correspondence between a medium-added address and a drive-calculated address in the case where the block address is 0x20005.

Figure 6:
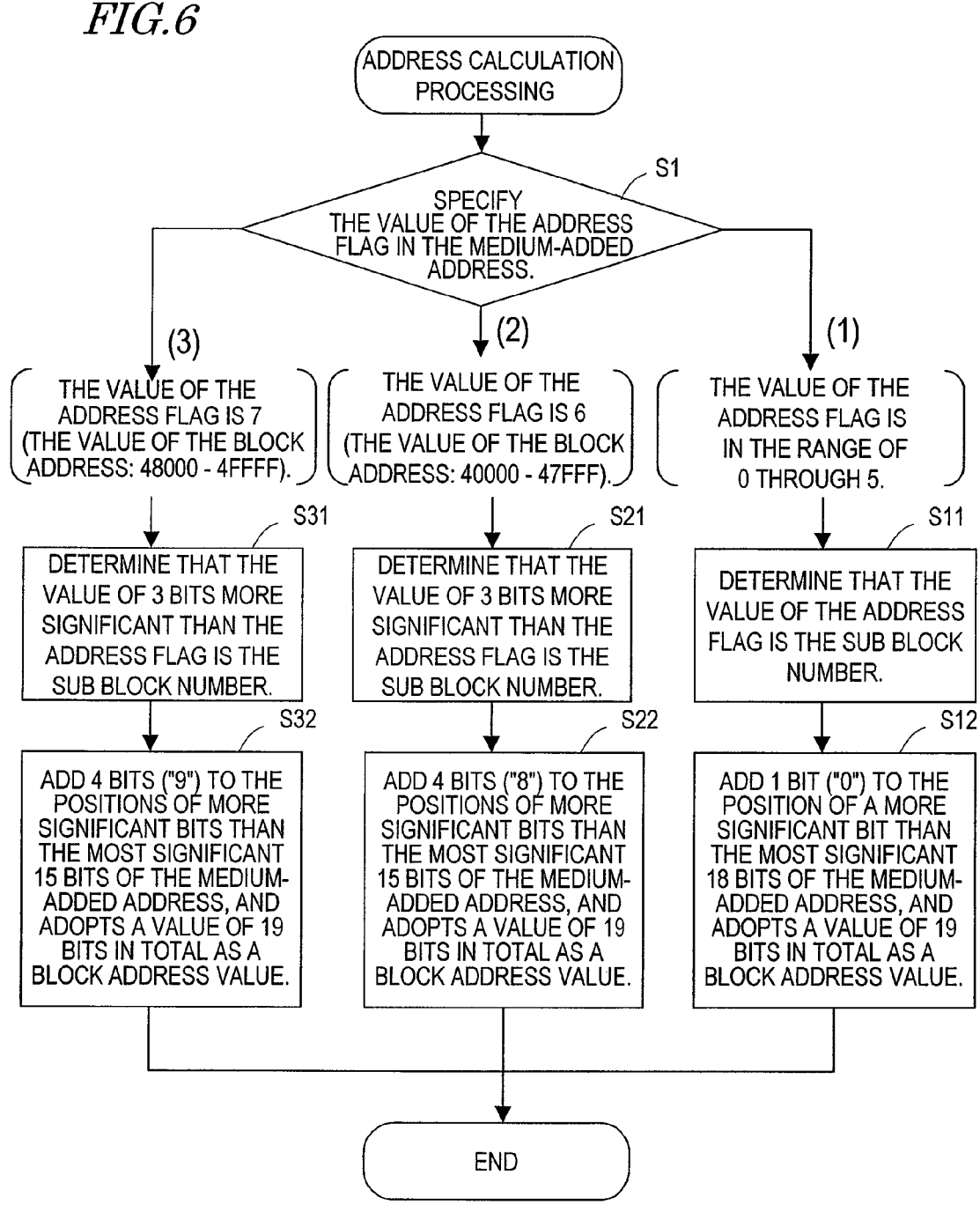
FIG. 6 is a flowchart showing a procedure of determination processing performed by the optical disc apparatus 310.

The address flag value represented by the least significant 3 bits of the medium-added address is 2 (FIG. 6, processing (1)). Therefore, the CPU 305 determines that the value represented by the least significant 3 bits is a sub block number (step S11). The CPU 305 virtually adds 1 bit representing a value of 0 ("0") to the position of a more significant bit than the most significant bit of the most significant 18 bits of the medium-added address (from the 4th least significant bit to the most significant bit), and adopts a block address of 0x20005 of 19 bits in total (step S12).

FIG. 7(B) shows the correspondence between a medium-added address and a drive-calculated address in the case where the block address is 0x40001.

The address flag value represented by the least significant 3 bits of the medium-added address is 6. Therefore, the CPU 305 finds that the address is a block address of an expanded area of 40000 through 47FFF (FIG. 6, processing (2)).

The CPU 305 first determines that 3 bits at the positions of more significant bits than the least significant 3-bit address flag (from the 4th least significant bit to the 6th least significant bit) represent a sub block number (step S21). In this example, the sub block number is 2. The CPU 305 virtually adds 4 bits representing a value of 8 ("1000") at the positions of more significant bits than the most significant bit of the most significant 15 bits of the medium-added address (from the 7th least significant bit to the most significant bit), and adopts a block address of 0x40001 of 19 bits in total (step S22).

In the example of FIG. 7(B), the block address value is in the range of 40000 through 47FFF. In the case where the address flag value represented by the least significant 3 bits of the medium-added address is 7, which indicates that the address is in the range of 48000 through 4FFFF, the CPU 305 may virtually add 4 bits representing a value of 9 ("1001") to calculate the address.

Since the CPU 305 performs the above-described determination processing on the address value, the track address reproducing circuit 304 can perform the same demodulation processing on an address value as performed on an address value of the conventional optical disc. Since it is not necessary to add any new circuit or new processing, the target block for data recording or reproduction can be easily searched for and retrieved.

After the determination processing on the address value, data recorded at the address is read or data is recorded to the address. Hereinafter, processing on data recording will be described.

The data recording/reproducing circuit 306 adds an address in accordance with the address format shown in FIG. 4(A) or FIG. 4(B) to the data to be recorded.

Figure 4:
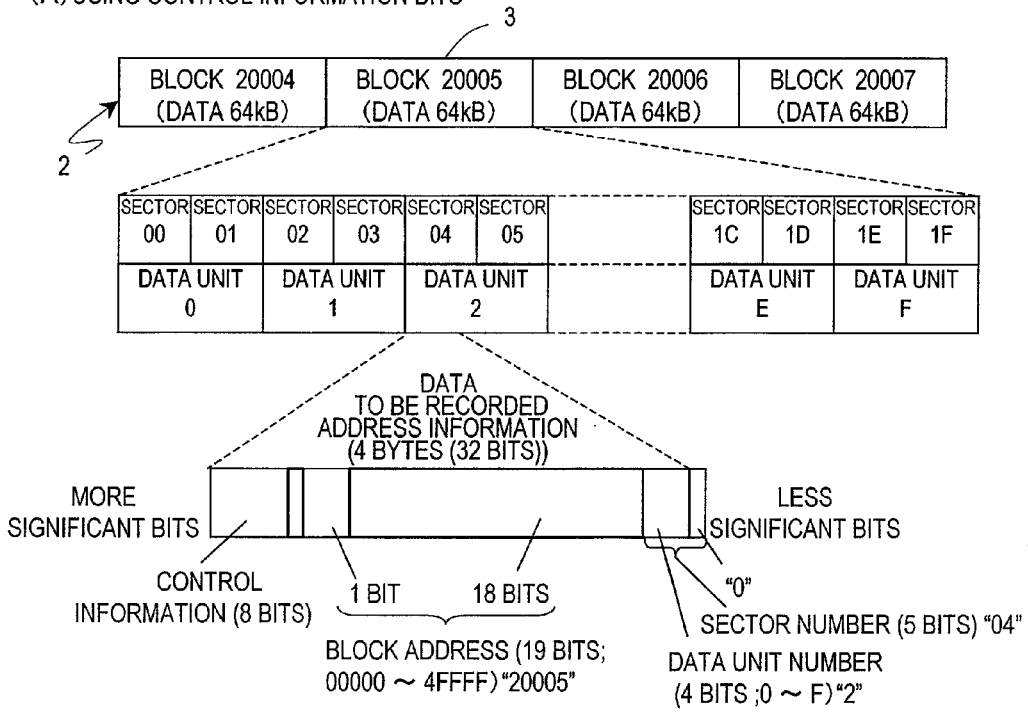
FIGS. 4(A) and (B) each show an address format of data addresses to be added to data, which is to be recorded on an optical disc according to an embodiment of the present invention.
Figure 4:
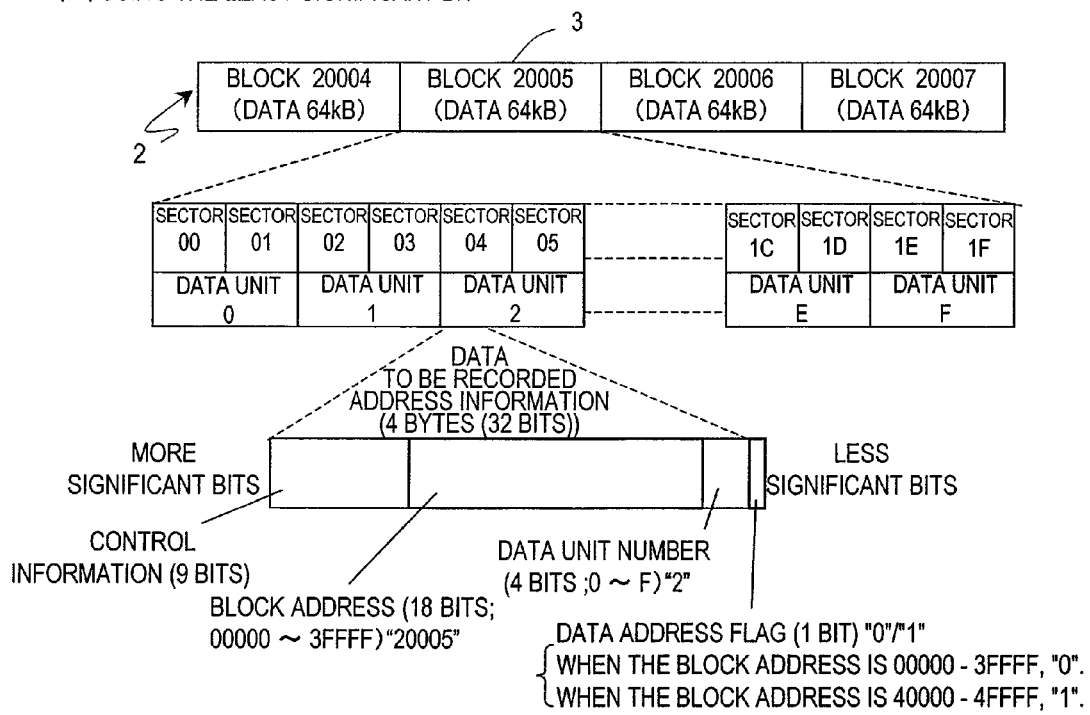

As described in Embodiment 1 with reference to FIG. 4, the data is divided into blocks and further into sectors.

When the data address format shown in FIG. 4(A) is adopted, the data recording/reproducing circuit 306 sets the number of bits of control information to be 8 instead of 9 and uses 1 bit added to the position of the most significant bit of the block address. Owing to this, the values of 00000 through 4FFFF can be used as a block address value of 19 bits in total. The reason why the number of bits for the control information is not 9 is that all the 9 bits do not need to be used as the control information, as described above.

When the data address format shown in FIG. 4(B) is adopted, the data recording/reproducing circuit 306 divides 5 bits conventionally representing a sector number, so that the least significant 1 bit is used to represent a data address flag and the most significant 4 bits are used to represent a data unit number. When the value of the block address to be recorded is in the range of 00000 through 3FFFF, the data recording/reproducing circuit 306 sets the data address flag to be 0. When the value of the block address to be recorded is in the range of 40000 through 4FFFF, the data recording/reproducing circuit 306 sets the data address flag to be 1. In the conventional optical disc, the data address is added to the start of each data unit, and so the assigned sector number is always even-numbered. Namely, the least significant bit is always 0. Such a least significant bit, which should be usually 0, is made 1 and the other bits are interpreted differently as described in Embodiment 1, so that the recording area can be expanded to cover the addresses 40000 through 4FFFF with the same number of bits as that of the conventional address format.

The data address remains being 32 bits in total. Therefore, the data address reproducing circuit 307 does not need to be significantly changed. Only the processing of confirming the data address performed by the CPU 305 needs to be changed. Thus, the address format can be easily used for an expanded data recording capacity.

For recording data, the data recording/reproducing circuit 306 adds a data address in accordance with the data format shown in FIG. 4(A) or FIG. 4(B) to the data and performs data modulation processing to generate a recording signal.

For reproducing data, the data recording/reproducing circuit 306 extracts 32-bit data address information from the result of data demodulation performed in accordance with the data modulation of the above-described recording operation, based on the data signal, and notifies the data address to the CPU 305. The CPU 305 confirms the block address and the sector number or the data unit number in accordance with the data format shown in FIG. 4(A) or FIG. 4(B). When the block address is reproduced based on the data address before the block address pre-recorded on the track is reproduced by the track address reproducing circuit 304, the CPU 305 performs a search operation for a block to be reproduced using the block address of the data address.

As described above, for an area where data has not been recorded, the block address pre-recorded on the track is used. For an area where data is already recorded, the block address pre-recorded on the track or the data address, which is reproduced first, is used. In this manner, the time for the search operation in data recording/reproduction can be shortened.

In the above embodiment, the most significant bit of the 4 bits conventionally representing the control information is used as the bit added to the position of the most significant bit of the data address. Alternatively, other bits are usable.

Embodiment 3

In the above embodiments, examples of the address format of a pre-recorded address or a data address to be recorded are described.

In this embodiment, examples of the address format of a pre-recorded address or a data address to be recorded will be described.

Figure 8:
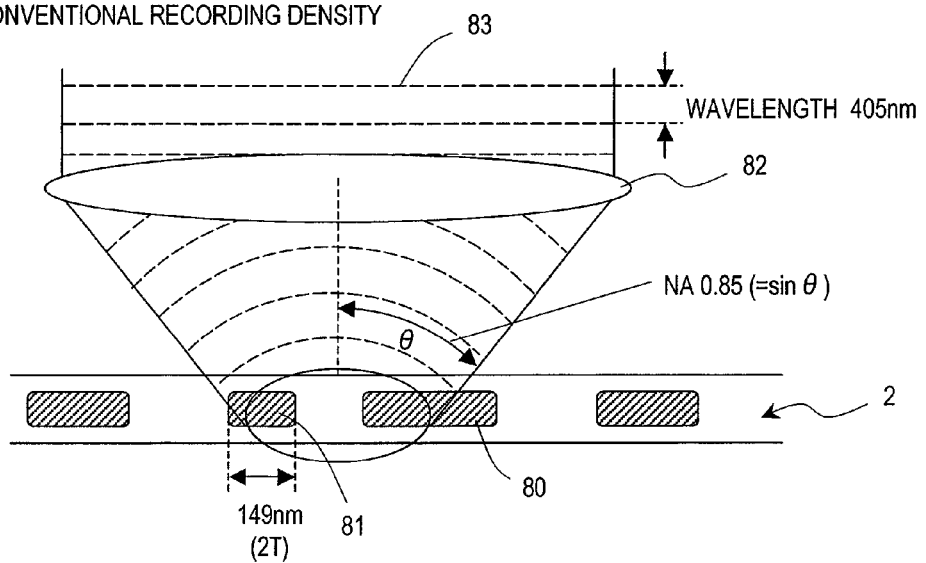
FIG. 8(A) shows an example of a BD having a conventional recording density.
FIG. 8(B) shows an example of a high density disc having a recording density higher than that of the BD.
Figure 8:
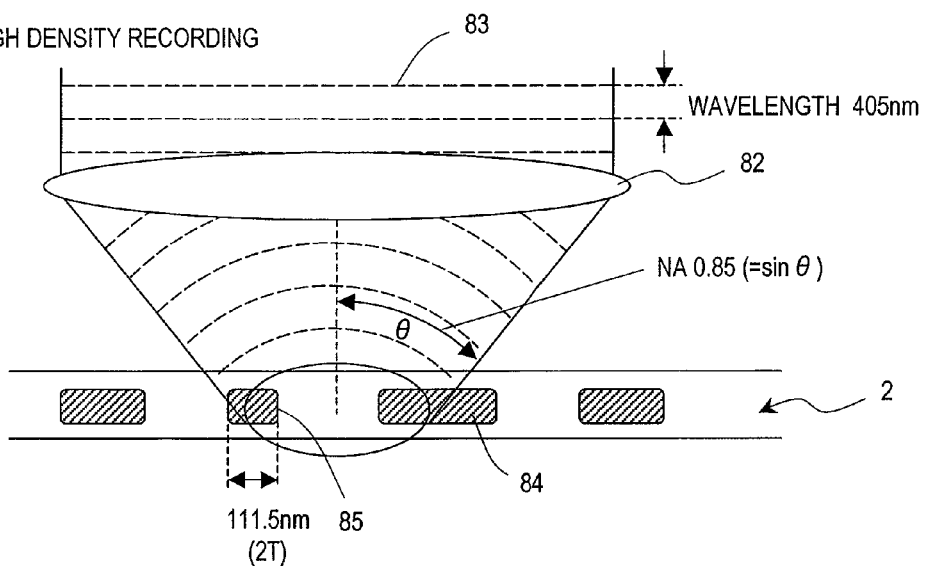

FIG. 8(A) shows an example of a BD having a conventional recording density. In this embodiment, the "conventional recording density" is assumed to be 25 GB for one information recording layer.

For a BD, the laser light wavelength is 405 nm, the numerical aperture of the objective lens is 0.85, and the length of the shortest recording mark 2T to be recorded on the track is 149 nm.

FIG. 8(B) shows an example of an optical disc having a recording density higher than that of the BD (hereinafter, referred to as a "high density disc"). In a high density disc, the recording density is assumed to be 33.4 GB for one information recording layer, i.e., 1.336 times of the conventional recording density.

For a high density disc, like for a BD, the laser light wavelength is 405 nm and the numerical aperture of the objective lens is 0.85. The length of the shortest recording mark 2T to be recorded on the track is 111.5 nm, which is shorter than that of the BD. Owing to this, the high density disc realizes a higher recording density than that of the BD.

An amplitude of a signal reproduced from a recording mark by a light beam decreases as the recording mark is shortened, and becomes zero at the limit of the optical revolving power. The inverse of the cycle of the recording mark is called "spatial frequency", and the relationship between the spatial frequency and the reproduction signal amplitude is called OTF (Optical Transfer Function). The reproduction signal amplitude decreases almost linearly as the spatial frequency increases. The limit (frequency) at which the reproduction signal amplitude becomes zero is called "OTF cutoff".

The OTF cutoff is determined based on the laser light wavelength $\lambda$, the numerical aperture NA of the objective lens, the length Tm of the shortest recording mark and the length Ts of the shortest space. The condition in which Tm+Ts is equal to $\lambda/(2NA)$ corresponds to the limit of the optical resolving power. When Tm+Ts is smaller than this, the OTF cutoff is exceeded.

Figure 12:
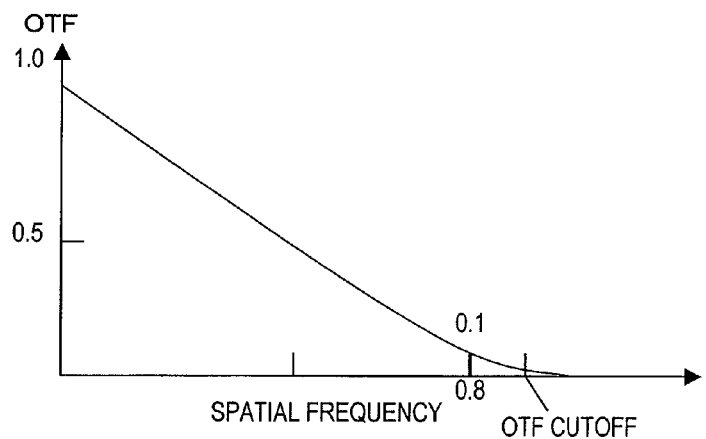
FIG. 12 shows the relationship between the OTF cutoff and the shortest recording mark regarding a BD having the conventional recording density.

FIG. 12 shows the relationship between the OTF cutoff and the shortest recording mark regarding a BD having the conventional recording density. It is seen that the shortest recording mark of the BD having the conventional recording density is about 80%, and the reproduction signal amplitude thereof is about 10%, with respect to the OTF cutoff. The recording density at which the spatial frequency of the shortest recording mark exceeds the OTF cutoff is about 31 GB or about 32 GB of the BD. The recording density assumed in FIG. 8(B) exceeds such a value.

An address format of the high density disc according to this embodiment is set so as to have compatibility with the address format of the BD in a recording area of 0 to 25 GB. Namely, the number of bits used in the address format of the high density disc is the same as the number of bits used in the address format of the BD. In an area of equal to or greater than 25 GB, the number of bits used in the address format of the high density disc is the same as that of the address format of the BD on the disc, but the addresses are described with an expanded address format.

Hereinafter, an address format for the track of a BD and an address format to be added to the recording data will be described. First, the address format to be added to the recording data will be described, and then a method for calculating an address by a reproducing apparatus will be described together with the address format for the track.

Figure 9:
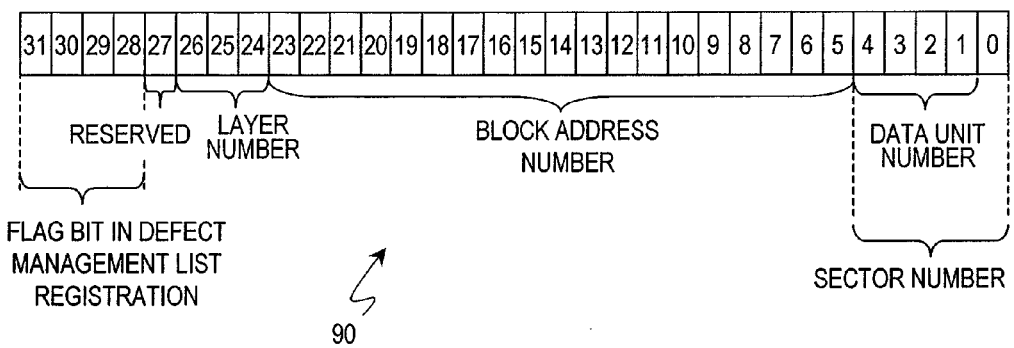
FIG. 9 shows a data address format 90 of a BD.

FIG. 9 shows a data address format 90 of a BD. A data address to be added to the recording data is inserted for each data unit. One data unit includes 2 sectors.

In the BD, the data address is represented with 32 bits. The contents of the data address is as follows. Sequentially from the most significant bit, bit numbers 31 through 28 are assigned to a flag bit. A flag bit is added for registering a defective data address in a defect management list provided in a file management area (not shown) of the BD. Bit number 27 is an unused reserved bit.

Bit numbers 26 through 24 represent a layer number of an information recording layer. Bit numbers 23 through 5 represent a block address number. Bit numbers 4 through 1 represent a data unit number in the block. 5 bits including the bit numbers 4 through 1 and bit number 0 represent a sector number in the block.

The bit value of the bit number 0 is fixed to "0". This is common to the value of the least significant bit shown in FIG. 4(A) being fixed to "0".

In this embodiment, the above-described address format of the BD is expanded to construct an address format for a high density disc. Hence, processing performed by the optical disc apparatus 310 shown in FIG. 5 for calculating an expanded address based on an address recorded on a high density disc will be described.

FIG. 10A through FIG. 10D each show the correspondence between a medium-added address in the high density disc and an address calculated by the optical disc apparatus 310 (hereinafter, referred to as a "drive-calculated address").

Hereinafter, differences between the medium-added addresses shown in FIGS. 7(A) and (B) and the medium-added addresses shown in FIG. 10A and FIG. 10B will be described. There are two differences.

Figure 10A:
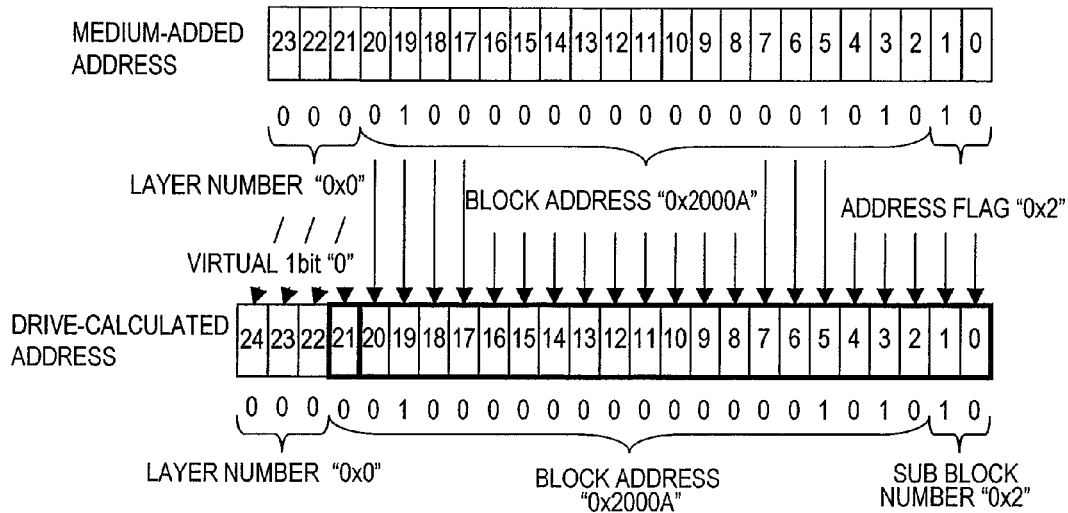
FIG. 10A shows the correspondence between a medium-added address in the high density disc and a drive-calculated address calculated by the optical disc apparatus 310.

A first difference is that in the BD and the high density disc, 3 bits from the most significant bit (bit numbers 23 through 21) represent layer number information as shown in, for example, FIG. 10A. The layer number is "000" for zeroth layer and is "001" for the first layer. Because of this difference, the position of the bit to be virtually added differs.

FIG. 10A shows the relationship between the medium-added address and the drive-calculated address when the layer number is 0, the block address is 0x2000A and the sub block address is 0x2.

In the example of FIG. 10A, the CPU 305 virtually adds 1 bit representing "0" to the position of bit number 21, and adopts 20 bits at bit numbers 21 through 2 as a block address. The CPU 305 also moves up bit numbers 23 through 21 of the medium-added address by one and adopts bit numbers 24 through 22 as information representing the layer number.

Figure 10B:
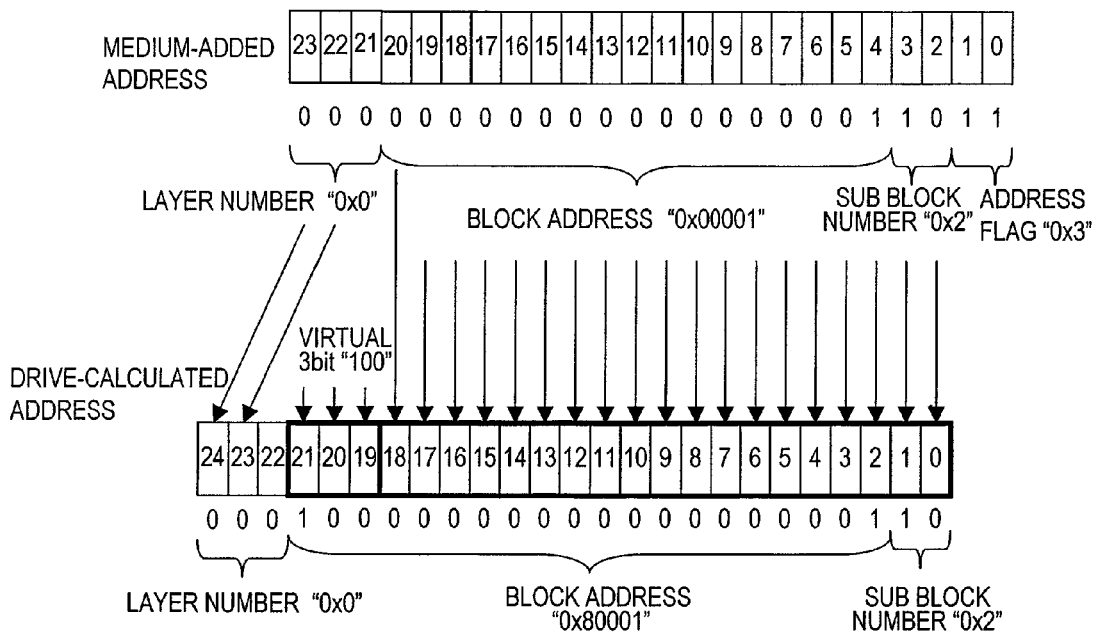
FIG. 10B shows the correspondence between a medium-added address in the high density disc and a drive-calculated address calculated by the optical disc apparatus 310.

FIG. 10B shows the relationship between the medium-added address and the drive-calculated address when the layer number is 0, the block address is 0x80001 and the sub block address is 2.

In the example of FIG. 10B, the CPU 305 virtually adds 3 bits representing "100" to the positions of more significant bits than bit numbers 4 through 21 of the medium-added address, and adopts 20 bits at bit numbers 21 through 2 as a block address. The CPU 305 also moves up bit numbers 23 through 21 of the medium-added address by one and adopts bit numbers 24 through 22 as information representing the layer number.

FIG. 10A and FIG. 10B both represent a case in which the layer number is 0. Now, examples of a second information recording layer will be described.

In a high density disc, the value of a physical address at, for example, a radial position of 24 mm is determined. On L0 layer having a layer number of 0, data is recorded from the innermost end toward the outermost end. Therefore, address expansion is necessary on the outer side on which the address value is larger.

By contrast, on L1 layer having a layer number of 1, data is recorded from the outermost end toward the innermost end, and the address value at the radial position of 24 mm on the inner side is determined as the bit inversion of the same position of L0 layer. Therefore, address expansion is necessary on the inner side on which the address value is smaller.

In consideration of this, the virtual additional bit is 1 bit at the least significant bit (LSB) of the layer number when the address flag represents 0 through 2. When the address flag represents 3 and the LSB of the layer number is "0", the virtual additional bit is "100". When the address flag represents 3 and the LSB of the layer number is "1", the virtual additional bit is "011".

Figure 10C:
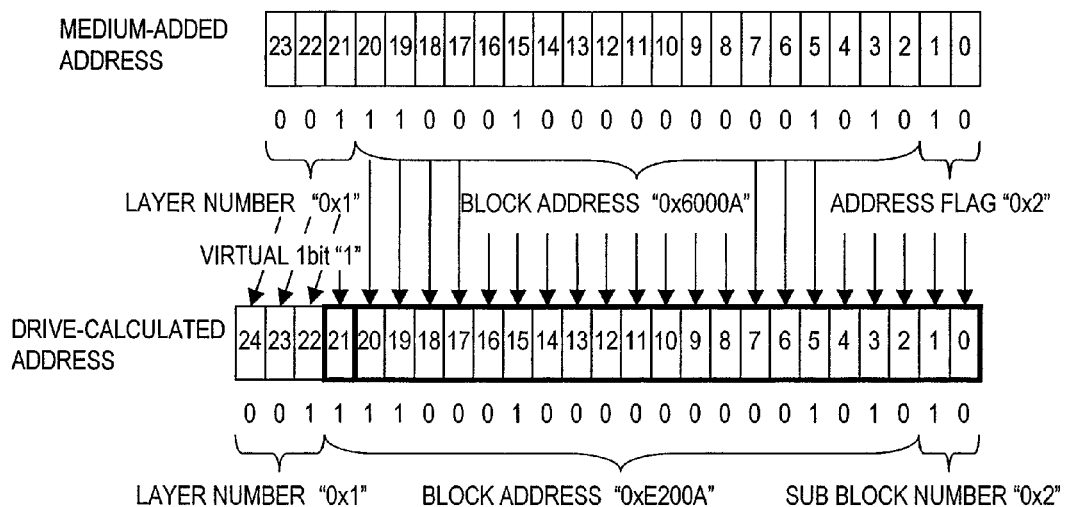
FIG. 10C shows the correspondence between a medium-added address in the high density disc and a drive-calculated address calculated by the optical disc apparatus 310.

FIG. 10C shows the relationship between the medium-added address and the drive-calculated address when the layer number is 1, the block address is 0xE200A and the sub block address is 0x2.

In the example of FIG. 10C, the CPU 305 virtually adds 1 bit representing "1" to the position of bit number 21, and adopts 20 bits at bit numbers 21 through 2 as a block address. The CPU 305 also moves up bit numbers 23 through 21 of the medium-added address by one and adopts bit numbers 24 through 22 as information representing the layer number.

Figure 10D:
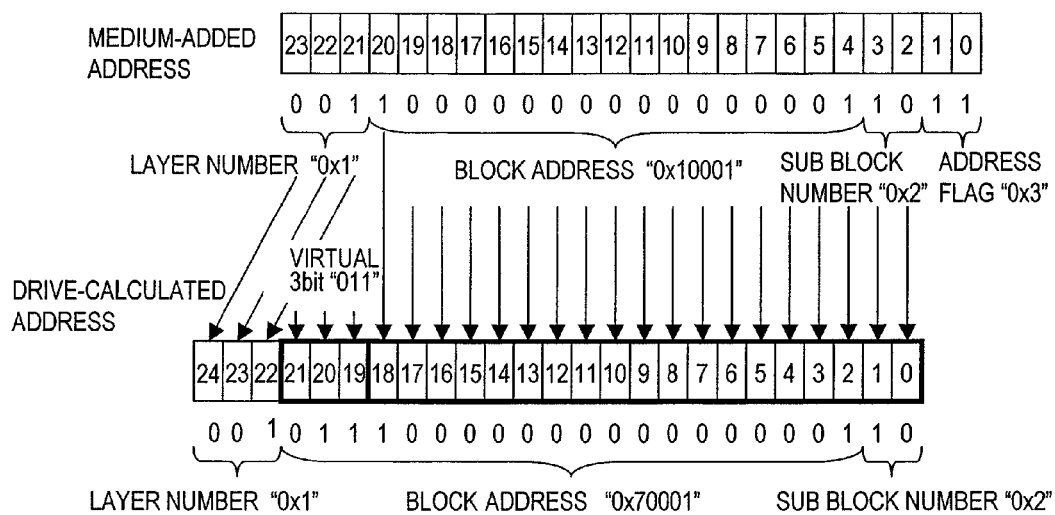
FIG. 10D shows the correspondence between a medium-added address in the high density disc and a drive-calculated address calculated by the optical disc apparatus 310.

FIG. 10D shows the relationship between the medium-added address and the drive-calculated address when the layer number is 1, the block address is 0x70001 and the sub block address is 2.

In the example of FIG. 10D, the CPU 305 virtually adds 3 bits representing "011" to the positions of more significant bits than bit numbers 4 through 20 of the medium-added address, and adopts 20 bits at bit numbers 21 through 2 as a block address. The CPU 305 also moves up bit numbers 23 through 21 of the medium-added address by one and adopts bit numbers 24 through 22 as information representing the layer number.

In the examples of FIGS. 7(A) and (B), the CPU 305 of the optical disc apparatus 310 calculates the block address by virtually adding 1 bit or 4 bits to the position(s) of more significant bits than the most significant bit. Note that in this embodiment, the position of the bit virtually added is not the position of a more significant bit than the most significant bit.

A second difference is that in the BD and the high density disc, 2 bits are assigned to the address flag as shown in, for example, FIG. 10A and FIG. 10B. This is because in the BD, one block includes 3 sub blocks. Accordingly, when the sub block number represented by the address flag is 0(0x0) through 2(0x2), the address format is compatible with BD, and when the sub block number represented by the address flag is 0x3, the address format represents an expanded area. In the former case, the calculation processing shown in FIG. 10A is performed, whereas in the latter case, the calculation processing shown in FIG. 10B is performed.

By expanding the address format of the BD as described above, addresses at which data can be described can be increased.

Figure 11:
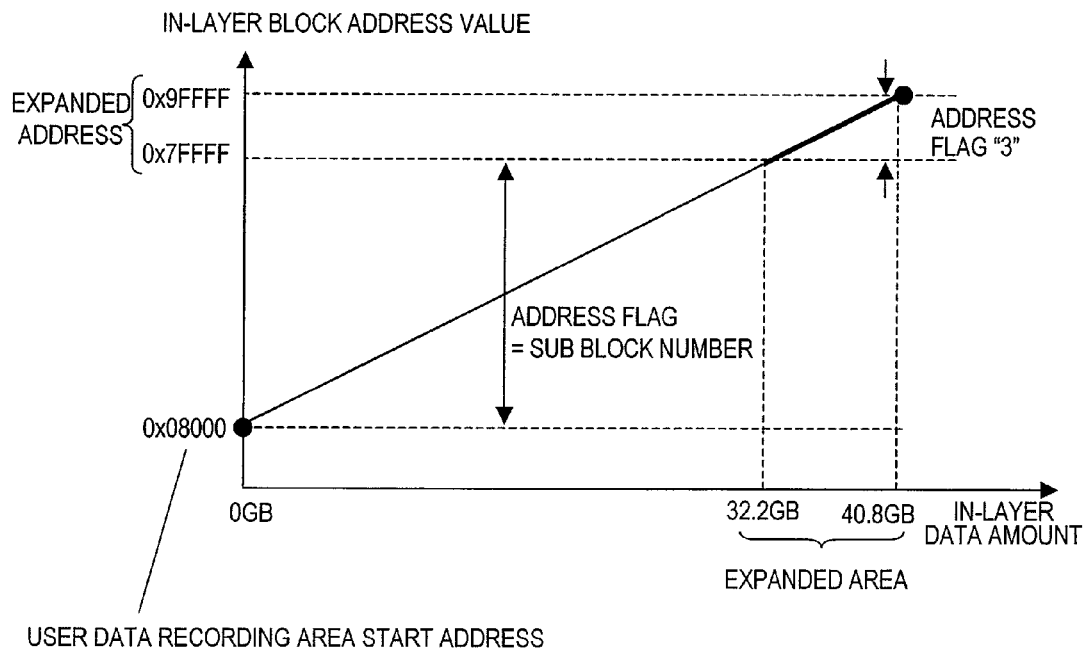
FIG. 11 shows the relationship between the values of addresses at which data can be described by an expansion format according to Embodiment 3 and the maximum recordable area.

FIG. 11 shows the relationship between the values of addresses at which data can be described in the zeroth layer by the expansion format according to this embodiment and the maximum recordable area.

In an information recording layer, a recording area which is assigned a block address smaller than 0x08000 is assigned as a file management area or a recording learning area. By contrast, in a recording area assigned a block address equal to or larger than 0x08000, user data is recorded.

In the BD, the maximum possible value of the block address is 0x7FFFF. In one block, user data of 65536 B is recorded. Hence, the maximum recordable capacity is about 32.2 GB. By contrast, in the high density disc having an expanded area, the maximum value of the block address is expanded to 0x9FFFF. In the high density disc according to this embodiment, the maximum recordable capacity is 33.4 GB for one information recording layer. According to the above-mentioned expansion format, however, addresses can be specified up to a recording capacity of 40.8 GB.

In this embodiment, the recordable capacity of the high density disc is 33.4 GB for one information recording layer. This is merely an example. The recordable capacity may be, for example, 30 GB, 33 GB, 33.3 GB, or 34 GB or larger.

Embodiments 1 through 3 have been described.

In the above embodiments, the address values are recorded on the track by the wobbling of the track. The present invention is not limited to this, and the address values can be recorded by inter-track pits or pits on the track.

In the above embodiments, where the data address flag represents 1, the block address is 40000 or greater, but the present invention is not limited to this.

In the above embodiments, an example of the optical disc apparatus usable for an optical disc on which data is recordable is described. The present invention is also applicable to an optical disc apparatus usable for a reproduction-only optical disc having data pre-recorded thereon.

The elements of the optical disc apparatus according to the present invention can be implemented as an LSI, which is an integrated circuit. The elements of the optical disc apparatus may be individually formed as a one-chip device, or a part or the entirety thereof may be incorporated into a one-chip device.

Here, the integrated circuit is referred to as an LSI. The integrated circuit may be referred to as an IC, LSI, super LSI, or ultra LSI depending on the degree of integration.

The integrated circuit of the present invention is not limited to an LSI, and may be implemented as a dedicated circuit or a general purpose processor. An FPGA (Field Programmable Gate Array) which is programmable after the production of an LSI or a reconfigurable processor in which the circuit cell connection or setting in the LSI is reconfigurable may be used.

When another circuit integration technology replacing the LSI appears by the development of the semiconductor technologies or by derivation from the semiconductor technologies, such a technology may be used to integrate the functional blocks. Application of biotechnology or the like is one possibility.

Finally, a brief supplemental explanation will be given regarding a BD (Blu-ray disc) as an example of optical disc according to the present invention. The main optical constants and physical formats of a Blu-ray disc are disclosed in "Blu-ray Disc Reader" published by Ohmsha, Ltd. or the white papers put on the web site of the Blu-ray Association (http://www.blu-raydisc.com/).

For the BD, laser light having a wavelength of 405 nm (where the tolerable error range is ±5 nm, 400 to 410 nm) and an objective lens having NA=0.85 (where the tolerable error range is ±0.01, 0.84 to 0.86) are used. The track pitch is 0.32 μm. The channel clock frequency is 66 MHz (66.000 Mbits/s) at the BD standard transfer rate (1×), 264 MHz (264.000 Mbits/s) at the BD4× transfer rate, 396 MHz (396.000 Mbits/s) at the BD6× transfer rate, and 528 MHz (528.000 Mbits/s) at the BD8× transfer rate. The standard linear velocity (reference linear velocity, 1×) is 4.917 m/sec.

The thickness of a protective layer (cover layer) is decreased as follows as the numerical aperture is increased and so the focal distance is shortened. The thickness of the protective layer is also decreased in order to suppress the influence of a spot distortion caused by a tilt. In contrast to 0.6 mm in the case of a DVD, the thickness of the protective layer of a BD may be 10 to 200 μm among the total thickness of the medium of about 1.2 mm (more specifically, where the substrate has a thickness of about 1.1 mm, a transparent protective layer having a thickness of about 0.1 mm is provided in a single layer disc, and a protective layer having a thickness of about 0.075 mm and a spacer layer having a thickness of about 0.025 mm are provided in a two layer disc). In a disc including three or more layers, the thickness of the protective layer and/or the spacer layer is further decreased.

In order to protect such a thin protective layer against being damaged, a projection may be provided outside or inside a clamp area. Especially where the projection is provided inside the clamp area, the following advantages are provided in addition to protecting the protective layer against being damaged. Since the projection is close to the central hole of the disc, the load on the rotation spindle (motor), which would be otherwise caused due to the weight balance of the projection, can be alleviated, and the collision of the projection and the optical head can be avoided because the optical head accesses the information recording area outside the clamp area.

Where the projection is provided inside the claim area, the specific position of the projection may be as follows, for example, in a disc having an outer diameter of 120 mm. Where the central hole has a diameter of 15 mm and the clamp area is provided in a region from a diameter of 23 mm to a diameter of 33 mm, the projection is provided between the central hole and the clamp area, namely, in a region from a diameter of 15 mm to a diameter of 23 mm. In this case, the projection may be provided at a position a certain distance away from the central hole (for example, the projection may be separated from the edge of the central hole by equal to or more than 0.1 mm (or/and equal to or less than 0.125 mm)). Alternatively, the projection may be provided at a position a certain distance away from the clamp area (for example, the projection may be separated from the inner end of the clamp area by equal to or more than 0.1 mm (or/and equal to or less than 0.2 mm)). Still alternatively, the projection may be provided at a position a certain distance away both from the edge of the central hole and the inner end of the clamp area (specifically, the projection may be provided in a region from a diameter of 17.5 mm to a diameter of 21.0 mm). The height of the projection may be determined such that the protective layer is unlikely to be damaged or the disc is easily raised in terms of balance. If the projection is excessively high, another problem may arise. Hence, for example, the height of the projection may be equal to or less than 0.12 mm from the clamp area.

The stacking structure of the layers may be as follows. In the case of, for example, a one-sided disc used for information reproduction and/or recording with laser light incident on the side of the protective layer, where there are two or more recording layers, there are a plurality of recording layers between the substrate and the protective layer. The multi-layer structure in such a case may be as follows, for example. A reference layer (L0 layer) is provided at the position which is farthest from the light incidence surface and is away from the light incidence surface by a prescribed distance. Other layers (L1, L2, . . . Ln) are stacked on the reference layer toward the light incidence surface while the distance from the light incidence surface to the reference layer is kept the same as the distance from the light incidence surface to the recording layer in a single-layer disc (for example, about 0.1 mm). By keeping the distance to the farthest layer the same regardless of the number of layers in this manner, the following effects are provided. The compatibility can be maintained regarding the access to the reference layer. In addition, although the farthest layer is most influenced by the tilt, the influence of the tilt on the farthest layer is prevented from being increased as the number of layers increases. The reason is that the distance to the farthest layer is not increased even if the number of layers increases.

Regarding the spot advancing direction/reproduction direction, either the parallel path or the opposite path is usable, for example. By the parallel path, the spot advancing direction/reproduction direction is the same in all the layers, namely, is from the innermost end toward the outermost end in all the layers, or from the outermost end toward the innermost end in all the layers. By the opposite path, where the spot advancing direction/reproduction direction is from the innermost end toward the outermost end in the reference layer (L0), the spot advancing direction/reproduction direction is from the outermost end toward the innermost end in L1 and is from the innermost end toward the outermost end in L2. Namely, the reproduction direction is from the innermost end toward the outermost end in Lm (m is 0 or an even number) and is from the outermost end toward the innermost end in Lm+1 (or is from the outermost end toward the innermost end in Lm (m is 0 or an even number) and is from the innermost end toward the outermost end in Lm+1). In this manner, the reproduction direction may be opposite between adjacent layers.

Now, the modulation system of the recording signal will be briefly described. For recording data (original source data/pre-modulation binary data) on a recording medium, the data is divided into parts of a prescribed size, and the data divided into parts of the prescribed size is further divided into frames of a prescribed length. For each frame, a prescribed sync. code/synchronization code stream is inserted (frame sync. area). The data divided into the frames is recorded as a data code stream modulated in accordance with a prescribed modulation rule matching the recording/reproduction signal characteristic of the recording medium (frame data area).

The modulation rule may be, for example, an RLL (Run Length Limited) coding system by which the mark length is limited. The notation "RLL(d,k)" means that the number of 0's appearing between 1 and 1 is d at the minimum and k at the maximum (d and k are natural numbers fulfilling d<k). For example, when d=1 and k=7, where T is the reference cycle of modulation, the length of the mark or space is 2T at the shortest and 8T at the longest. Alternatively, the modulation rule may be 1-7PP modulation, in which the following features [1] and [2] are added to the RLL(1,7) modulation. "PP" of 1-7PP is an abbreviation of Parity preserve/Prohibit Repeated Minimum Transition Length.

[1] "Parity preserve" represented by the first "P" means that whether the number of 1's of the pre-modulation source data bits is an odd number or an even number (i.e., Parity) matches whether the number of 1's of the corresponding post-modulation bit pattern is an odd number or an even number.

[2] "Prohibit Repeated Minimum Transition Length" represented by the second "P" means a mechanism for limiting the number of times the shortest marks and spaces are repeated on the post-modulation recording wave (specifically, a mechanism for limiting the number of times 2T is repeated to 6).

The prescribed modulation rule is not applied to the sync. code/synchronization code stream inserted between the frames. Therefore, the sync. code/synchronization code stream can have a pattern other than the code length restricted by the modulation rule. The sync. code/synchronization code stream determines the reproduction processing timing for reproducing the recorded data and so may include any of the following patterns.

From the viewpoint of distinguishing the sync. code/synchronization code stream from the data code stream more easily, a pattern which does not appear in the data code stream may be included. For example, a mark/space longer than the longest mark/space included in the data code stream or a repetition of such a mark/space may be included. Where the modulation system is 1-7 modulation, the length of the mark or space is limited to 2T through 8T. Therefore, a 9T mark/space longer than 8T mark/space, or a repetition of a 9T mark/space may be included, for example.

From the viewpoint of facilitating the synchronization lock-up processing or the like, a pattern having many mark-space transfers may be included. For example, among marks/spaces included in the data code stream, a relatively short mark/space or a repetition of such a mark/space may be included. Where the modulation system is 1-7 modulation, a 2T mark/space which is the shortest, a repetition thereof, a 3T mark/space which is the second shortest or a repetition thereof may be included, for example.

Here, an area including the synchronization code stream and the data code stream is referred to as a "frame area", and a unit including a plurality of (e.g., 31) frame areas is referred to as an "address unit". In an address unit, an inter-code distance between a synchronization code stream included in an arbitrary frame area of the address unit and a synchronization code stream included in a frame area other than the arbitrary frame area may be 2 or greater. The "inter-code distance" means the number of bits which are different between two code streams. Owing to the arrangement in which the inter-code distance is 2 or greater, even if a 1-bit shift error occurs in one of the streams to be read due to an influence of noise or the like during reproduction, such a stream is not identified as the other stream by mistake. Alternatively, the inter-code distance between a synchronization code stream included in a frame area located at the start of the address unit and a synchronization code stream included in a frame area located at a position other than the start of the address unit may be 2 or greater. Owing to such an arrangement, it is easily distinguished whether the synchronization code stream is at the start or not, or whether the synchronization code stream is at the junction of address units or not.

The term "inter-code distance" encompasses an inter-code distance in an NRZ notation of the code stream in the case of NRZ recording and also an inter-code distance in an NRZI notation of the code stream in the case of NRZI recording. Therefore, in the case of recording performed by the RLL modulation, "RLL" means that the number of continuous high-level or low-level signals on the recording wave of NRZI is limited and so means that the inter-code distance is 2 or greater in the NRZI notation.

The present invention is useful for increasing the recording density of an optical disc, and is usable for a large capacity optical disc, and an optical disc apparatus, an optical disc recording/reproducing method and an integrated circuit usable for such an optical disc.

What is claimed is:

1. An optical disc, in which a track on which data is recordable is divided into a plurality of blocks, and each block includes L pieces of sub blocks, wherein:

on each sub block, M-bit first digital information specifying a block address of a block including the each sub block and N-bit second digital information capable of representing a numerical value equal to or larger than L are recorded;

where a value of the block address is smaller than a threshold value, the second digital information represents a value specifying a number pre-assigned to the each sub block;

whereas where the value of the block address is equal to or larger than the threshold value, the second digital information represents a value other than the value specifying the number pre-assigned to the each sub block; or where the value of the block address is equal to or larger than the threshold value, the second digital information represents the value specifying the number pre-assigned to the each sub block; whereas where the value of the block address is smaller than the threshold value, the second digital information represents a value other than the value specifying the number pre-assigned to the each sub block.

* * * * *